Figure 1:
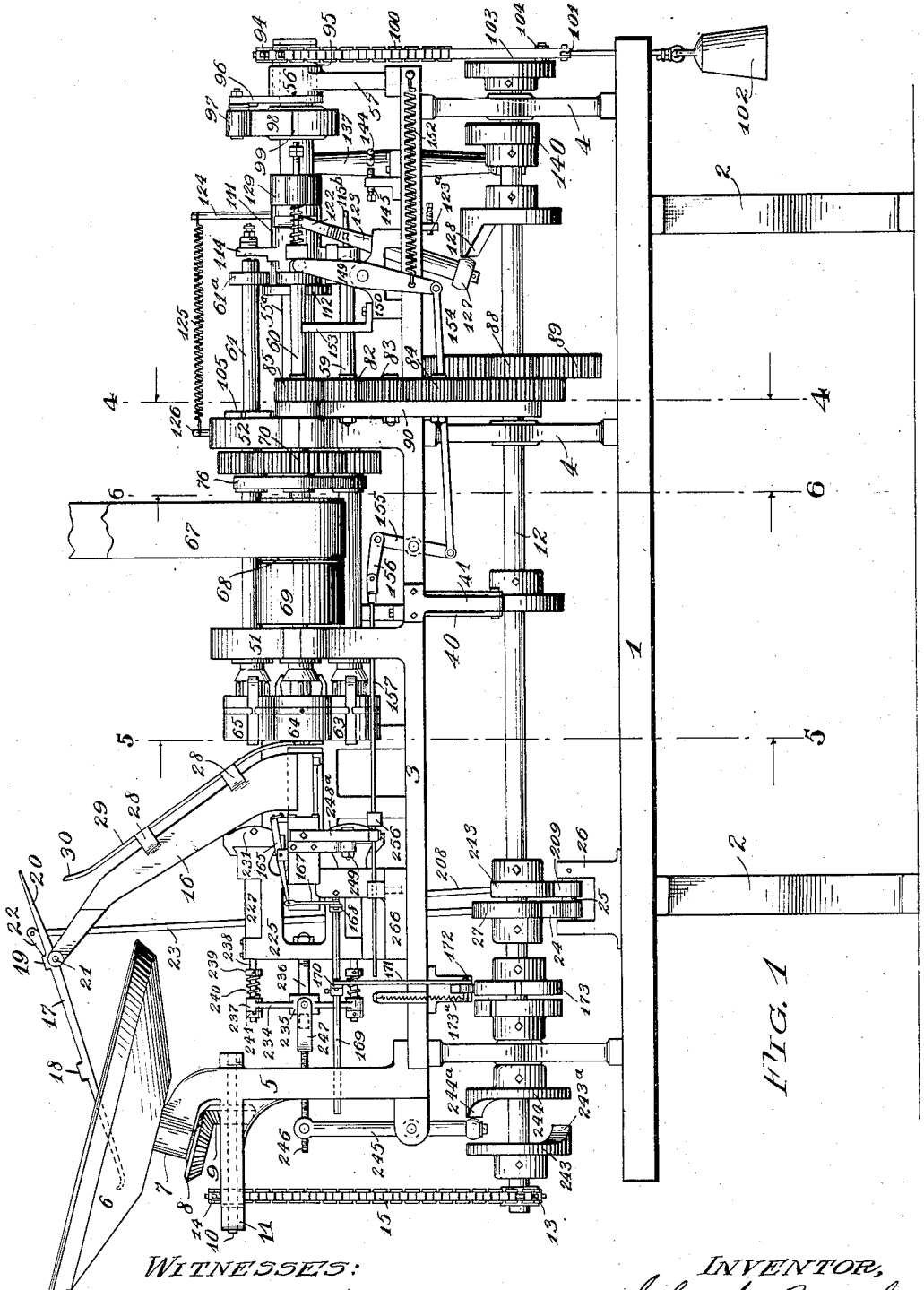

J. S. BROUGHTON.
SCREW MACHINE.
APPLICATION FILED MAR. 7, 1908.

945,486.

Patented Jan. 4, 1910.
8 SHEETS—SHEET 1.

WITNESSES:
INVENTOR,
John S. Broughton
BY Bates, Fouts & Hull
ATTYS.

J. S. BROUGHTON.
SCREW MACHINE.
APPLICATION FILED MAR. 7, 1908.

945,486.

Patented Jan. 4, 1910.
8 SHEETS—SHEET 2.

WITNESSES:
Brennan B. West.
Nathan F. Fretter

INVENTOR,
John S. Broughton
BY Bates, Fouts & Hull,
ATTYS.

J. S. BROUGHTON.
SCREW MACHINE.
APPLICATION FILED MAR. 7, 1908.

945,486.

Patented Jan. 4, 1910.

8 SHEETS—SHEET 3.

WITNESSES:
Brennan B. West
Nathan F. Fretter

INVENTOR,
John S. Broughton
BY Oates, Fouts & Hull
ATTYS.

J. S. BROUGHTON
SCREW MACHINE.
APPLICATION FILED MAR. 7, 1908.
945,486.
Patented Jan. 4, 1910.
8 SHEETS—SHEET 4.
FIG. 5
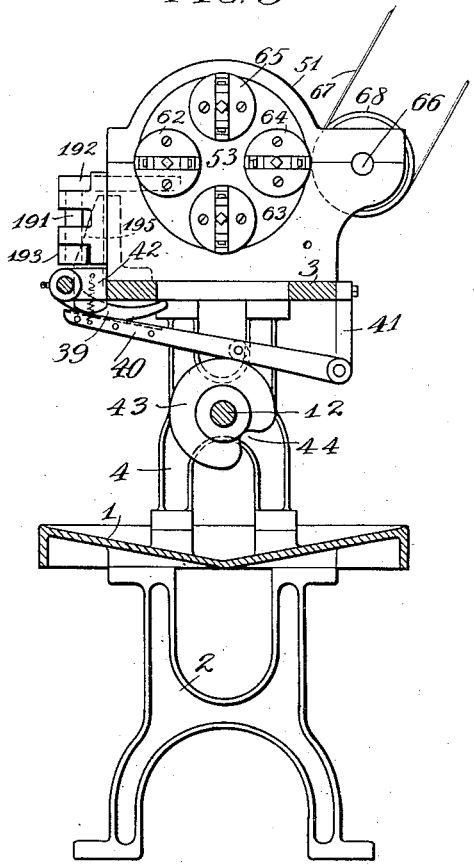
FIG. 6
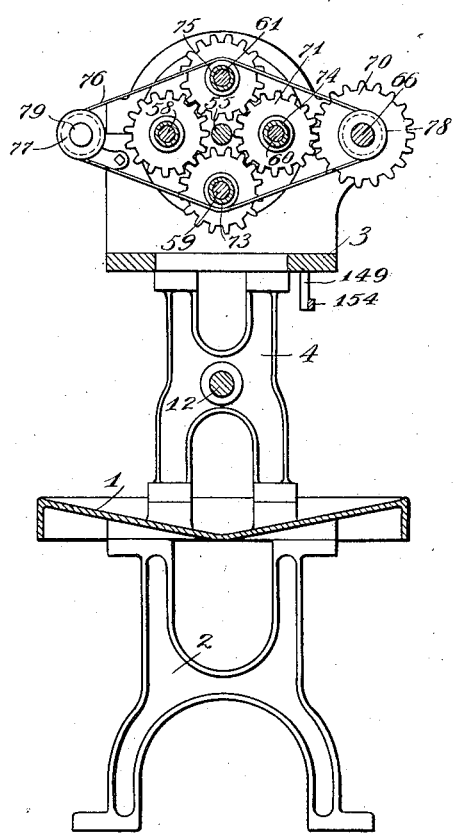
FIG. 13
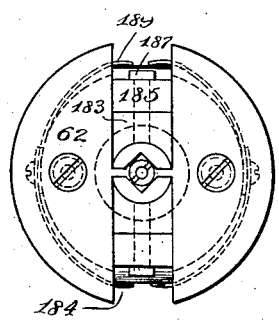
FIG. 14
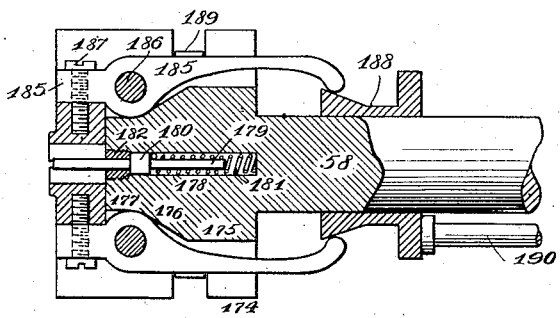
FIG. 15
WITNESSES:
Brennan B. West.
Nathan F. Fretter
INVENTOR,
John S. Broughton
By Bates, Fouts & Hull
ATTYS.

J. S. BROUGHTON.
SCREW MACHINE.
APPLICATION FILED MAR. 7, 1908.

945,486.

Patented Jan. 4, 1910.
8 SHEETS—SHEET 5.

WITNESSES:
Brennan B. West
Nathan F. Fretter

INVENTOR,
John S. Broughton
BY Bates, Fouts & Hull,
ATTYS.

J. S. BROUGHTON.
SCREW MACHINE.
APPLICATION FILED MAR. 7, 1908.
945,486.
Patented Jan. 4, 1910.
8 SHEETS—SHEET 6.
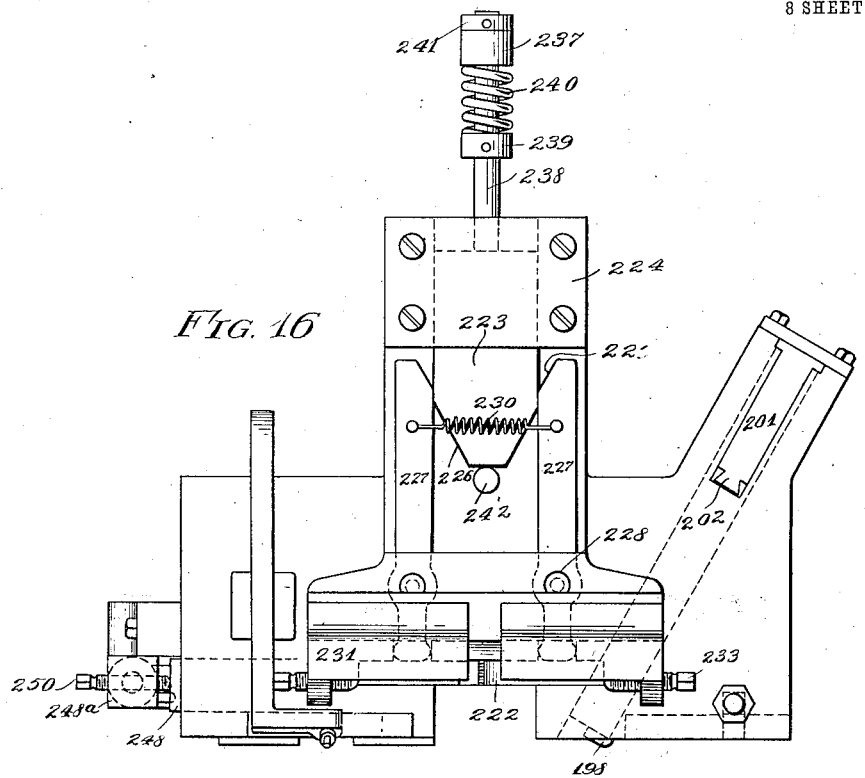
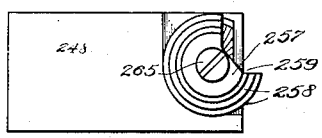
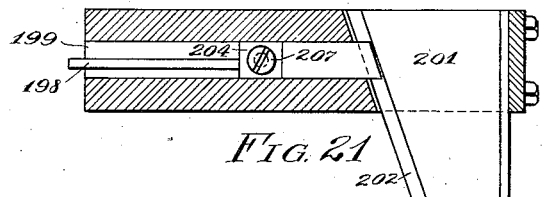
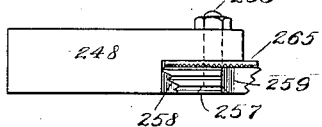
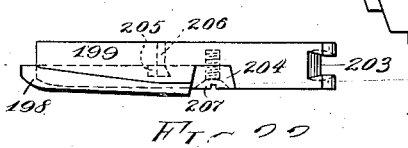
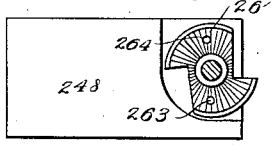
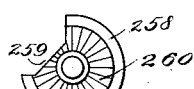
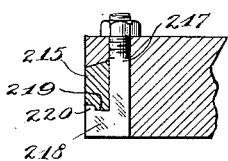
WITNESSES:
Brennan B. West
Nathan F. Fetter
INVENTOR,
John S. Broughton
BY Bates, Fouts & Hull
ATTYS.

J. S. BROUGHTON.
SCREW MACHINE.
APPLICATION FILED MAR. 7, 1908.
945,486.
Patented Jan. 4, 1910.
8 SHEETS—SHEET 7.
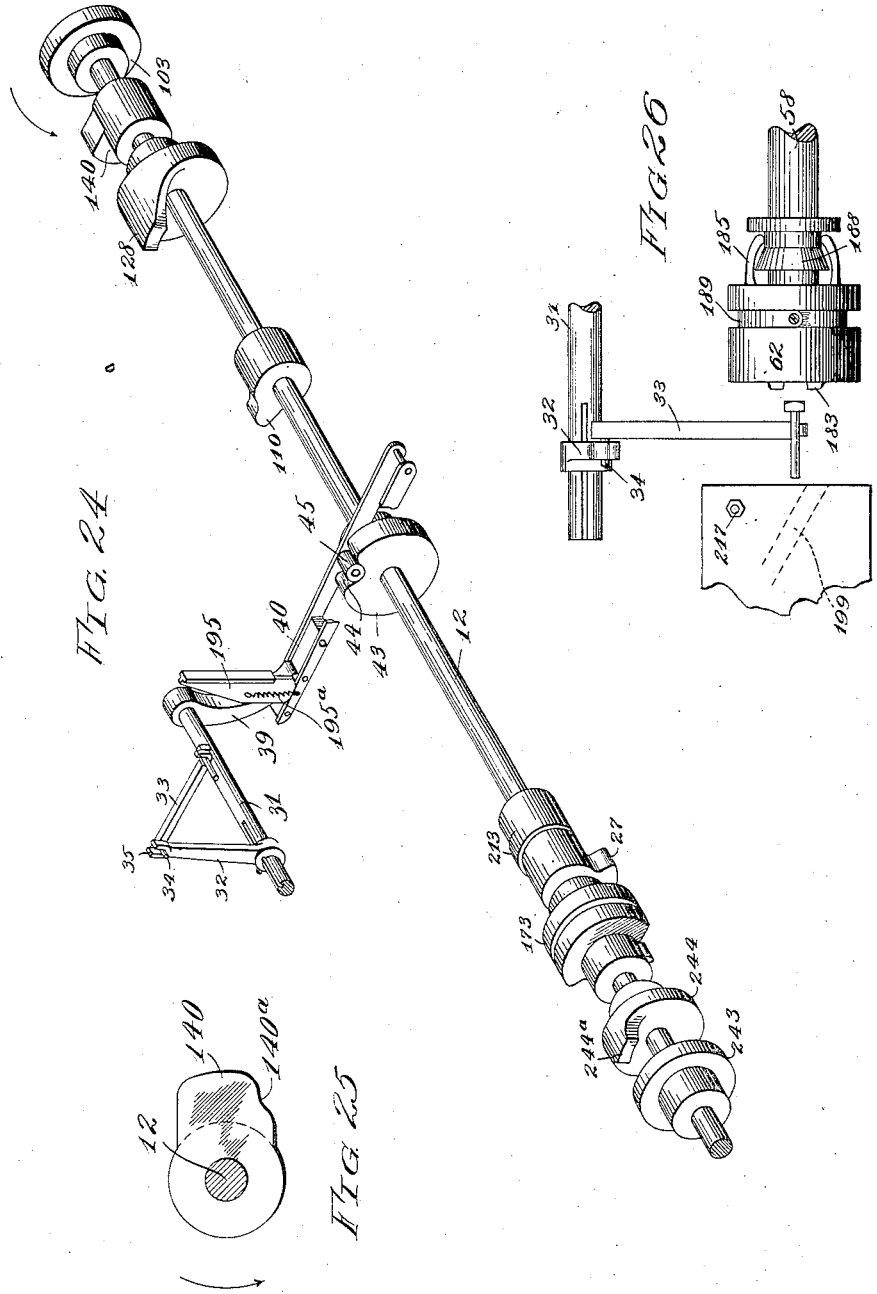

J. S. BROUGHTON.
SCREW MACHINE.
APPLICATION FILED MAR. 7, 1908.
945,486.
Patented Jan. 4, 1910.
8 SHEETS—SHEET 8.
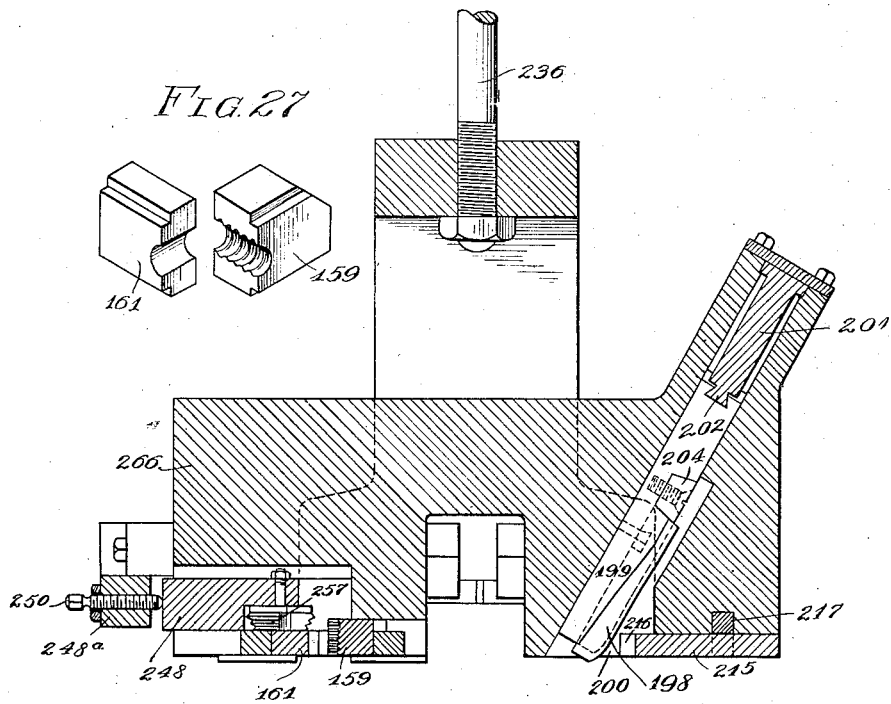
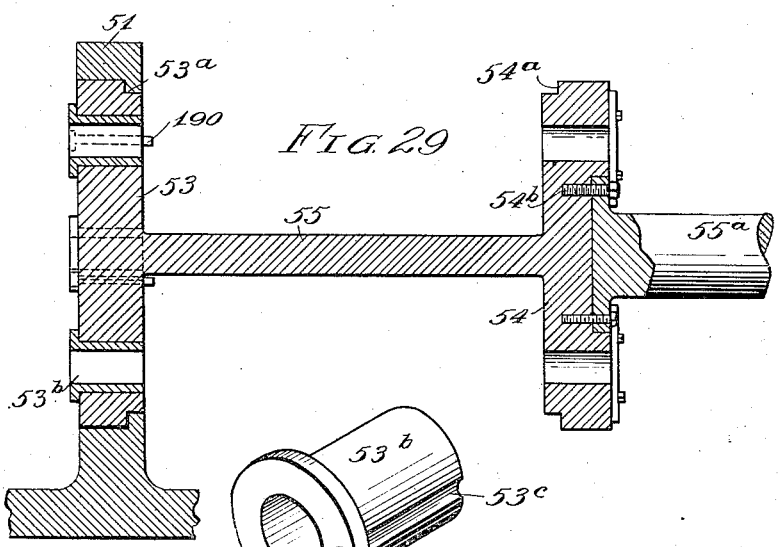

UNITED STATES PATENT OFFICE.

JOHN S. BROUGHTON OF LAKEWOOD, OHIO.

SCREW-MACHINE.

945,486.  Specification of Letters Patent.  Patented Jan. 4, 1910.

Application filed March 7, 1908. Serial No. 419,671.

*To all whom it may concern:*

Be it known that I, JOHN S. BROUGHTON, residing at Lakewood, in the county of Cuyahoga and State of Ohio, have invented a certain new and useful Improvement in Screw-Machines, of which the following is a full, clear, and exact description, reference being had to the accompanying drawings.

This invention relates to machines for making large screws, or bolts, such as are known to the trade as "coach" screws, and has for its objects to produce a machine of this type which, while comparatively simple of construction, will automatically perform the operations of preliminarily pointing or coning a headed blank, preliminarily threading said blank, providing the blank thus threaded with what is known to the trade as a "gimlet" point, finishing the threads applied to the blank by the former threading operation, and automatically ejecting the finished screw or bolt.

In carrying out my invention, the blanks, each consisting of a cylindrical body having at one end an angular head, are fed into a hopper; from the hopper they are automatically fed to a chute, whence they are conducted by an automatically operating carrier to the first in order of operation of a series of holders, by means of which the blank is gripped and is subjected to the first operation of coning, or pointing, hereinbefore referred to. The holders are mounted on spindles which extend through turret heads, and the said holders and the turret heads are intermittently rotated to subject the blanks carried by said holders successively to the operations above referred to.

By my invention, I am enabled to perform, in a single machine, a series of operations, which, so far as I am advised, have heretofore been accomplished only by the use of a corresponding number of separate machines, and to perform all such operations simultaneously and automatically with marked efficiency, and to reduce to a minimum the labor and other expense necessary for producing the finished articles.

Generally speaking, the invention may be defined as consisting of the combinations of elements embodied in the claims hereto annexed and illustrated in one embodiment in the accompanying drawings forming part hereof wherein—

Figure 2:
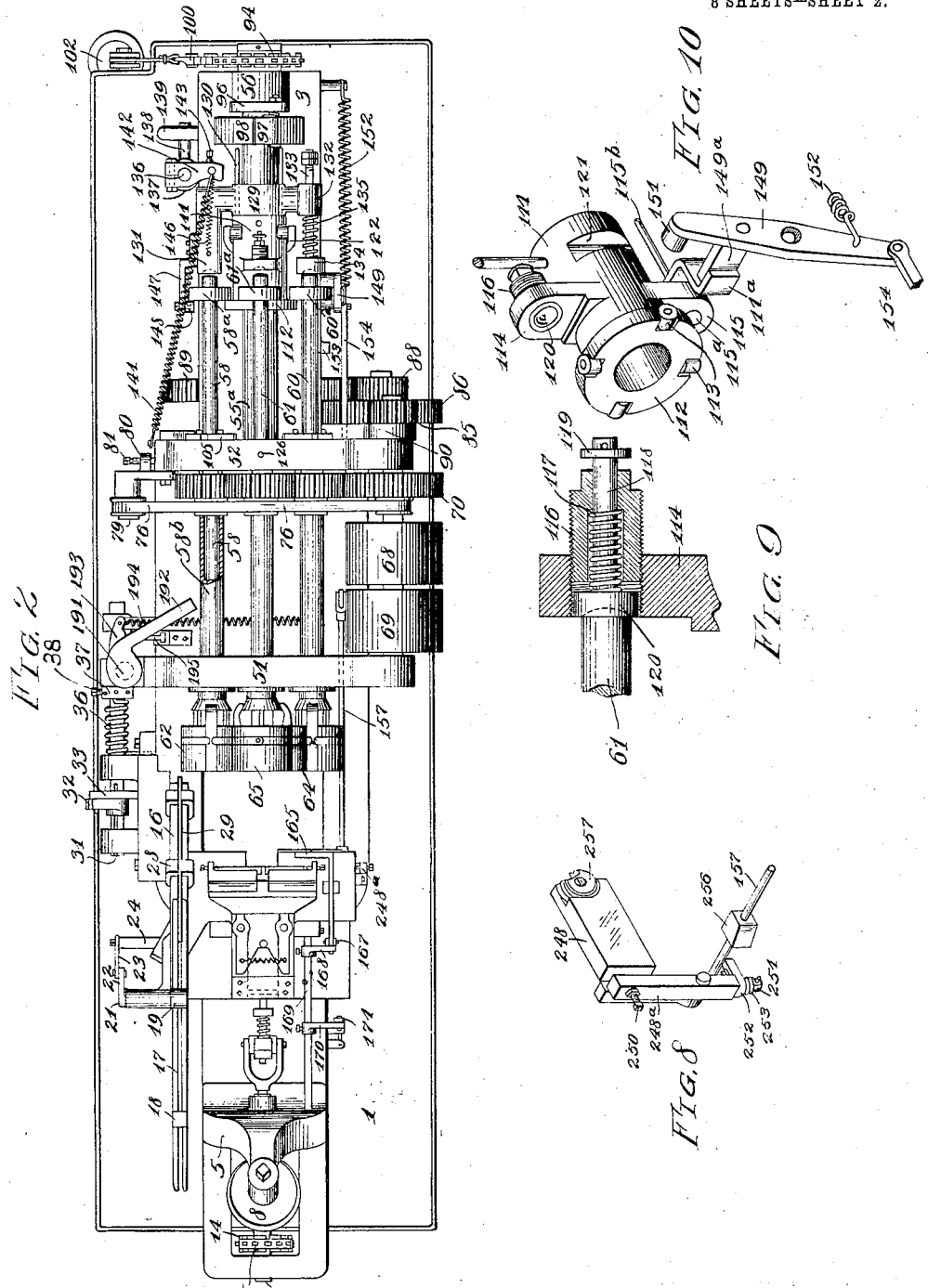
Figure 3:
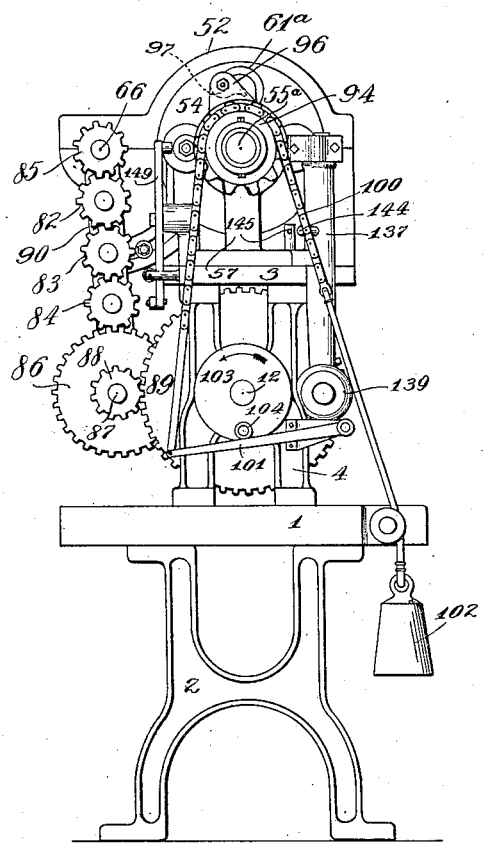
Figure 4:
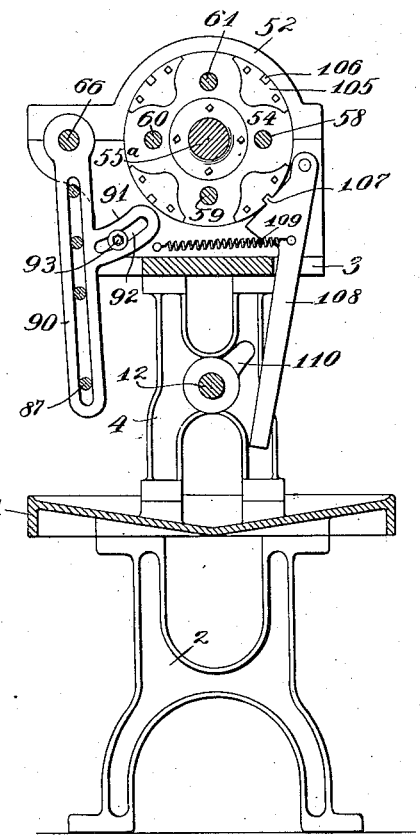

Figure 1 represents a side elevation of a machine constructed in accordance with my invention; Fig. 2 represents a plan view of the machine shown in Fig. 1, the blank-receiving hopper being omitted for clearness of illustration; Fig. 3 represents a rear elevation of such machine; Figs. 4, 5, 6 and 7 represent vertical sectional views on the correspondingly-numbered lines of Fig. 1, the latter view being enlarged; and Figs. 8 to 30 inclusive represent detail views of various portions of the machine to which reference will be made hereinafter.

The machine consists generally of a power shaft, a turret-head shaft driven thereby, a series of holders for blanks carried by the turret heads, spindles for rotating the holders, means for rotating said spindles, means for reciprocating said spindles and the holders thereon, a series of cutting or operating devices corresponding to the holders, means for feeding blanks to the holders successively, a shaft, and connections whereby said shaft may control the reciprocation, rotation, and the opening and closing of the holders, the opening and closing of the cutting devices, the feeding of the blanks to the holders successively, and the various other operations of the machine.

The various portions of the machine are supported by a frame, said frame comprising generally a base 1 supported by brackets 2, and a horizontal frame-work 3 supported from the base 1 by brackets or standards 4. The horizontal frame work 3 supports the various movable parts thereabove and is provided at the front end thereof with an upwardly projecting bracket 5. This bracket supports the hopper of the feeding mechanism, which mechanism will now be described.

*Feeding mechanism.*—The blank-feeding mechanism comprises a hopper 6 mounted on an inclined shaft which projects through the inclined bearing 7 at the upper end of bracket 5 and is provided at its lower end with the beveled gear 8 meshing with a similar gear 9 on a horizontal shaft 10, having its front end supported in a yoke 11 projecting forwardly from bracket 5 and its rear end supported by said bracket. Shaft 10 is rotated continuously by means of a horizontal shaft 12 which is journaled in the brackets 4 and has at the front end thereof a sprocket wheel 13 by means of which and a corresponding sprocket wheel 14 on shaft 10 and a chain 15, shaft 10 and hopper 6 are continuously rotated.

16 denotes an inclined guideway or chute having pivoted to its upper end the fork 17. This fork consists of a pair of parallel spaced members united by a pair of upwardly offset connections 18 and 19, the latter connection being located at the point at which the fork is pivoted to the chute 16. The front ends of the parallel members of the fork are curved upwardly, as shown in Fig. 1, and the rear ends are tapered, as shown at 20.

21 denotes a rock shaft which is journaled at the upper end of chute 16 and to which the fork 17 is secured. This rock shaft projects laterally from chute 16 and is provided with a rearwardly projecting arm or lever 22 rigid therewith and connected to a link rod 23, the lower end whereof is secured to a lever 24 (see Fig. 7) which extends transversely of the machine below shaft 12, having its opposite end pivoted to a shaft 25, supported between a pair of brackets 26 on the base 1. Shaft 12 is provided with a cam 27 adapted to engage lever 24 and thereby operate fork 17 through said lever and the connections above described. The chute 16 comprises a pair of spaced members or plates connected by upwardly offset straps 28, preferably integral therewith.

29 denotes a thin guide and retaining member supported by said straps and spaced from the adjacent upper edges of the chute members. Member 29 projects upwardly beyond the upper strap 28 and has its end bent upwardly, as shown at 30. It will be observed from Fig. 2, that member 29 is sufficiently narrow to pass between the rear ends 20 of the fork 17.

With the parts arranged as described, it will be apparent that, for every revolution of shaft 12, there will normally be an oscillation of the fork 17. When the lever 24 is in contact with the "low" portion of the cam 27, the front end of fork 17 will drop by gravity into the hopper. When the projection of the cam engages lever 24, the rear end of fork 17 is depressed and the front end elevated. The parts are so proportioned that, when lever 24 is in its lowermost position, fork 17 forms in effect a continuation of chute 16, with end 20 below member 30. The operation of the fork is normally to receive, by the rotation of the hopper, one or more blanks between the members thereof, the heads of the blanks resting on the tops of said members. When the fork is tilted upwardly, these blanks drop by gravity into the chute 16, the connections 18 and 28 being offset sufficiently to permit the heads to drop down the fork and down into the lower end of the chute. Should the chute be filled with blanks to such a height that all of the blanks in the fork 17 cannot pass off the end 20, fork 17 will be retained in its elevated position by reason of the heads of the blanks therein engaging member 30, which now overhangs the upper surface of 20. When in this position, lever 24 is in its lowermost position and is not affected by the cam 27. As soon as the blanks pass out of the end 20 of the fork, the fork again drops by gravity and the feeding operation is again resumed.

The lower or discharge end of chute 16 is in substantially the same horizontal plane as the axis of the adjacent holder, but is located at one side thereof, as will appear by reference to Fig. 2. For the purpose of delivering blanks from the chute to said holder, I provide a rock shaft 31 which is journaled at one side of the machine and is provided with an arm 32 rigid therewith, to which arm there is pivoted a carrier 33, said carrier extending transversely of the machine and having a pin 34 at its upper end engaging a fork 35 at the upper end of arm 32. (See Fig. 11.)

For the purpose of moving the carrier intermittently, the shaft 31 is operated as follows:—this shaft is provided with a spring 36 surrounding the same and having one end engaging a fixed part of the frame while the other end is inserted into collar 37 secured to said shaft by means of a set screw 38 (see Fig. 2). Spring 36 is under torsion and tends to rotate shaft 31 in a direction to throw carrier 33 inwardly. The rotation of shaft 31 by its spring is normally prevented by means of a curved arm 39, (see Figs. 5 and 24) which engages a lever 40 pivoted to the bracket 41 at the opposite side of the frame from shaft 31. This lever is held in contact with lever 39 by means of the spring 36, and said lever is operated by a cam 43 on shaft 12. The major portion of the outer surface of this cam is concentric with shaft 12, but is provided with a recess 44 therein. When the roller 45 between the branches of lever 40 enters recess 44, said lever is depressed by lever 39, and carrier 33 will be moved quickly inwardly, the inward movement of said carrier being determined by the depth of recess 44. Further rotation of shaft 12 elevates lever 40 and rocks shaft 31 in the reverse direction through lever 39. Thus, for every revolution of shaft 12, carrier 33 will be reciprocated from its receiving position under chute 16 to its delivering position opposite the adjacent holder and the cutting device that coöperates therewith.

Figure 11:
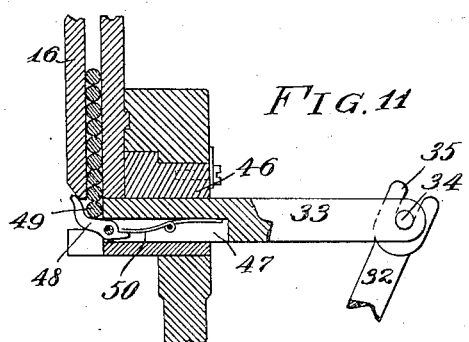
Figure 12:
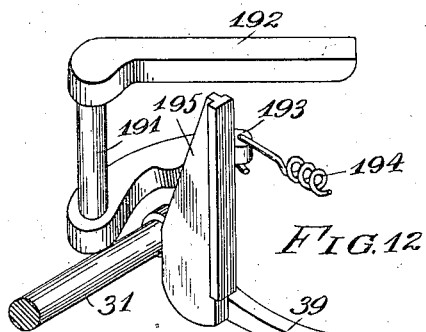

The construction of the carrier is shown in Fig. 11. As appears from said figure, the carrier reciprocates within a guide 46 provided in the side of the frame. The carrier is provided near the inner end and in the lower surface thereof with a recess 47 and has pivoted to its inner end within said recess a finger 48. This finger has an upwardly curved portion which projects beyond the inner end of the carrier and is adapted to receive the lowermost blank 49 in the chute 16. The upper end of finger 48, when the parts are in the positions shown in Fig. 11 (which shows the carrier in its extreme outward position) engages the lower end of the inner member of the chute, thereby holding the finger "open" against the action of spring 50, and enabling it to receive the lowermost blank from the chute. As soon as the carrier is moved inwardly by arm 32, the upper end of the finger is disengaged from the chute and spring 50 causes the finger to grip the blank securely between itself and the inner or front end of the carrier. The manner in which the blank is delivered to the proper holder will be described hereinafter in connection with the appropriate mechanism.

*Blank holding mechanism and means for operating the same.*—The blank-holding and operating mechanism comprises generally a turret shaft having thereon a pair of turret-heads supported in suitable bearings, a suitable number of holders (in the embodiment shown herein, four) each having a spindle which extends through said turret heads toward the rear of the machine, with means for rotating said turret shaft intermittently, means for reciprocating the holder spindles intermittently, means for rotating said spindles, means for periodically reversing the rotation of said spindles, and means for automatically causing each holder to receive and eject a blank.

The frame work 3 is provided with a pair of bearings 51 and 52, for the turret heads 53 and 54, respectively. These turret heads are shown in detail in Fig. 29. To prevent lateral movement thereof, the turret heads are provided each, within opposite faces thereof, with an annular recess $53^a$, $54^a$, respectively, adapted to receive corresponding projections in turret heads 51 and 52 respectively.

55 denotes a shaft section which connects said turret heads and is preferably cast therewith. The rear turret head 54 is provided with a central recess for the reception of the flanged end of an enlarged drive-shaft section $55^a$, which extends rearwardly through a bearing 56 supported by a bracket 57 at the rear of the machine, shaft $55^a$ being provided with mechanism for rotating the same intermittently, which will be described hereinafter.

It will be noted that the shaft section 55 is materially reduced as compared with section $55^a$, such reduction being rendered possible by reason of the fact that the spindles 58, 59, 60 and 61, which are connected respectively with the holders 62, 63, 64 and 65, extend through both turret heads and assist shaft section 55 in preventing relative rotary movement between said heads. (See Figs. 4 and 6.) The flanged end of shaft section $55^a$ is secured to the rear turret head in any suitable manner, bolts $54^b$ being shown for this purpose. The front turret head is provided with bushings $53^b$ for the reception of the spindles. These bushings will be described further at length in connection with the mechanism for automatically opening and closing the holders. For rotating these spindles, I provide the following construction:—66 denotes a shaft which is supported between the turret heads 51 and 52 and is driven by means of a belt 67, the shaft being provided with fast and loose pulleys 68 and 69. Shaft 66 is provided with a gear 70 which meshes with a gear 71 on spindle 60 (see Fig. 6). Spindles 58, 59 and 61 are provided with similar intermeshing gears, whereby each spindle is driven in a reverse direction from the preceding and following spindles in the series. Each of these spindles 58, 59, 60 and 61 is provided with a pulley preferably formed as the hub of its gear, said pulleys being shown respectively at 72, 73, 74 and 75; and each spindle has applied thereto a spacing sleeve (see $58^b$, Fig. 2) which extends between the front of its pulley hub and the front turret head, serving to take care of the forward thrust of the spindles when reciprocated (as hereinafter described) and prevent the forward movement of the gears on the spindles during such reciprocation, the gears being secured to the spindles by long keyways.

As stated hereinbefore, turret shaft 5 5 is rotated intermittently, being advanced a quarter of a turn periodically whenever the operations of the spindles are temporarily suspended. It will be apparent that whenever a rotation of the turret shaft is made, a different gear will be brought into mesh with gear 70, which new gear is rotating in a direction the reverse of that which gear 70 has imparted to its predecessor. To relieve the gears from the shock due to the sudden change in direction of rotation and to render such change noiseless, I have provided a belt 76 which contacts with the particular pulleys on the spindles that may be in the uppermost and lowermost positions, as will appear from Fig. 6. The sides of this belt extend around pulleys 77 and 78, the former being supported from a shaft 79 forming part of an angle lever which is pivotally connected to turret head 52. (See Fig. 2.) For the purpose of tightening the belt the inwardly extending arm of this lever is provided with a lug 80 having a set screw 81 threaded therethrough and engaging the turret head. By tightening this set screw, the angle lever may be swung outwardly to tighten the belt. Shafts 79 and 66 are in the same horizontal line with spindles 58 and 60. With this arrangement, when the turret shaft is given a quarter of a revolution, by means to be described hereinafter, pulleys 72 and 74 engage the belt prior to the engagement of the gear on spindle 59 with gear 70. In this manner, the gears are relieved from the sudden shock which would be caused by their direct engagement with the driving gear 70 while rotating in a direction the reverse from that in which the driving gear is being rotated. This effects a comparatively noiseless reversal of the gears and avoids jars and breaking of gear teeth.

For the purpose of rotating shaft 12, a sufficient number of idle gears 82, 83, and 84 are interposed between the driving gear 85 on rear end of shaft 66 and a train of reduction gearing comprising a large gear 86 which meshes with the lowermost gear 84 in the series of idlers, the said gear 86 being rigid with a shaft 87 to which a reducing gear 88 is secured, the latter gear meshing with the large gear 89 which drives shaft 12. Shafts for gears 82, 83, 84, 86 and 88 are carried by a quadrant 90, the upper end of which is pivoted to a projection from the turret head 52. This quadrant is provided with an arc-shaped member 91 having a slot 92 therein by means of which and a bolt 93 the quadrant may be swung inwardly or outwardly according to the size of the gears 88 and 89. By varying the size of such gears, the speed of shaft 12 may be regulated to cut a longer or shorter thread upon the blanks carried by the holders.

For the purpose of intermittently rotating the turret shaft a sufficient distance to shift a blank from one set of operating members to another, I provide the construction shown in Figs. 1, 2, 3 and 4. As will appear from these figures, the rear end of shaft $55^a$ has applied thereto a sprocket 94 provided with a forwardly projecting hub 95 which extends through bearings 56 and is provided at its front end with an arm 96 carrying a pawl 97 which overhangs a collar 98 rigid with shaft 55. This collar is provided, in this case, with four notches 99 therein adapted to receive the lower end of the pawl. 100 denotes a sprocket chain, one end of which is fastened to lever 101 and the other end of which is provided with a weight 102. Lever 101 is pivoted at one side of the machine and extends across the rear end of the same. Shaft 12 is provided with a disk 103 near its rear end, said disk being provided with a roller 104 adapted to engage lever 101. As shaft 12 rotates, roller 104 depresses lever 101 and rotates sprocket 94 backwardly a quarter of a turn, lifting weight 102. As roller 104 rises, weight 102 rotates sprocket 94 and rotates shaft $55^a$ a quarter of a revolution, through pawl 97 and collar 98. To retain the shaft in fixed position during the backward shifting of the sprocket thereon, I provide turret head 54 with four rearwardly projecting plates 105 each having a notch 106 therein for the reception of a lug 107 carried by a lever 108. (See Fig. 4.) This lever is provided with a spring 109 which normally holds lug 107 in one of the slots 106. Shaft 12 is provided with a cam 110 which engages the lower end of lever 108 and retains the lug 107 out of engagement with a plate 105 while the turret shaft is being rotated through weight 102 and sprocket chain 100.

By the construction described, I have disclosed means whereby the holder spindles are rotated and the holders are intermittently advanced to bring the blanks carried thereby in operative relation to the different devices which operate thereupon. I will now describe the mechanism whereby the said spindles may be reciprocated during the time that the blanks are subjected to the action of said operating mechanism. Each spindle may be said to become in turn a coning spindle, a threading spindle, a gimlet-pointing spindle and a finishing-threading spindle, according to the position which it occupies in its cycle of rotation. When operating as a coning or pointing spindle, the blank must be advanced from the point toward the head and afterward retracted to permit it to be brought in line with the first threading spindle. The preliminary threading spindle, by means of which the blank is subjected to the first thread-cutting operation, must be advanced in a similar manner to the coning spindle to enable its dies to cut a thread on the blank from the point toward the head thereof. The temporary gimlet-pointing spindle, however, in practice is subjected to two reciprocations with respect to its cutting device and, in the case of a long bolt, is subjected to three such reciprocations, and the parts are so arranged that the gimlet point is applied to the bolt during the backward movement of the spindle. The temporary finishing-threading spindle, whereby the thread cut by the second operation is finished, operates in the same general manner as the second or preliminary-threading spindle, and in this connection it is noted that each holder is provided with an ejector which is automatically operated after the blank has received this finishing thread. For the purpose of securing these different operations of each spindle, the following construction is employed: 111 denotes a member which I shall designate as a "drawback" member. This drawback member is generally cylindrical in shape, as appears by reference to Figs. 1, 2, and 10, and is provided at its front end with a circular flange 112 having in its periphery a series of radially extending rollers 113 located 90 degrees apart. Intermediate of its ends it is provided with upwardly and downwardly projecting flanges 114 and 115, the former flange being provided with a rearwardly projecting sleeve 116 threaded thereinto, said sleeve containing a spiral spring 117 and a plunger 118 (see Fig. 9). This plunger is provided with a washer 119 serving as a stop to limit the forward movement thereof and has at its front end a cupped head 120. Projection 115 is provided with a recess 115$^a$. Member 111 is provided with oppositely-arranged recesses 121 for the reception of the forks 122 of a lever 123. This lever is pivoted to the frame 3 in any suitable manner. The member 111 is also provided with an upwardly projecting rod 124 to which a spring 125 is attached, said spring being secured at its opposite end to a pin 126 carried by turret head 52. Member 111 is loosely mounted on shaft section 55$^a$. The lower end of lever 123 is provided with a roller 127 which is adapted to be engaged by the forwardly projecting portion 128 of a cam mounted on shaft 12. 129 denotes a crosshead member which is also loosely mounted on shaft 55 at the rear of member 111. This latter member is provided with longitudinal apertures adapting it to receive a pair of pins 130 projecting rearwardly from member 111. Member 129 is provided at one side thereof with an integral forwardly projecting operating member 131 having its front end cupped and is provided at its opposite side with a projection 132 through which there extends a bolt 133 having at its front end a cupped head 134, between which and 132 there is interposed a spring 135. The front ends of 131, 134 and of projections 114 and 115 at the stage of the operation of the machine illustrated herein are in substantially the same vertical plane.

The rear ends of spindles 58, 59, 60 and 61 are engaged respectively by members 131, 115, 134 and 114. Each of these spindles is provided with a collar 58$^a$, 59$^a$, 60$^a$, and 61$^a$, respectively, which, when the draw-back member 111 is in the retracted position shown herein, are in engagement with the rollers 113 in flange 112.

Spindles 58 and 60 are operated through casting 129 and connections to be now described:—136 denotes a vertical shaft which is rotatably supported within a casting 137 (see Figs. 1 and 2). Below the casting 137 shaft 136 is provided with an angular arm 138 projecting therefrom and provided with a roller 139. This roller engages a cam 140 on shaft 12, being held in engagement with said cam by means of a spring 141 which is connected at one end to an arm 142 rigidly secured to the top of shaft 136 and at its other end to a pin on top of turret bearing 52. Arm 142 is provided with a screw 143 which extends therethrough and bears against the rear face of the crosshead 129. Cam 140 is shown in Figs. 24 and 25 which represent respectively a perspective view of the cam shaft 12 and a sectional view thereof. This cam is provided with a stop projection which, after roller 127 on the lower end of lever 123 rides off the projection 128 on its cam, temporarily blocks the forward movement of crosshead 129 by spring 141. In the rear face of projection 140, there is provided a stop projection 140$^a$ which temporarily limits the forward movement of crosshead 129 and of the coning and gimlet-pointing spindles, permitting the carrier to be drawn out of the way of the holder on the temporary coning spindle. When the roller 139 leaves stop 140$^a$, the crosshead 129 moves forward until its movement is arrested by the engagement of a pin 144 with an adjustable stop 145 carried by a standard supported by the frame 3. Pin 144 is carried by shaft 136 and projects through a slot in the casing 137.

In practice, the forward movement given to the coning spindle after engagement with its knife is about three quarters of an inch, whereby the blank in holder 62 will be tapered a corresponding distance. When roller 139 is on the elevated portion of cam 140, crosshead 129 is held in its retracted position by means of a spring 146, which is connected at one end to the crosshead and at its other end to arm 142. The forwardly projecting member 131 of crosshead 129 is provided with an arm 147 which has an inwardly projecting roller 148 adapted to engage the front face of collar 58$^a$ and thereby retract spindle 58 when crosshead 129 is retracted by spring 146.

I will now describe the construction whereby the threading spindles, represented by 59 and 61, are reciprocated. The spindle which occupies the position of spindle 59 is the spindle which causes the preliminary threading of the blank after it has been coned. The rear end of the spindle which occupies the position of spindle 59 in the drawing normally rests in the cup-shaped recess 115$^a$ in the downwardly extending flange 115 of draw-back member 111. By means of this projection and spring 125, the preliminary threading spindle is carried forward when member 111 is allowed to be so moved by its cam 128 and lever 123. The spindle, represented at 61, by which the finished thread is formed on the blank has its rear end yieldingly supported in the cup-shaped recess formed in plunger head 120, said plunger being carried by the projection 114. By this construction, the two threading spindles are carried forward by means of the member 111, but the blank carried by the preliminary-threading spindle will engage its dies or cutters slightly in advance of the blank carried by the other spindle.

In practice, the blank carried by the preliminary threading spindle is advanced within its dies or cutters about a quarter of an inch before the blank carried by the other spindle enters its dies or cutters. This gives the latter blank an opportunity to find its place in its die and enables such die to cut an accurate finished thread on the blank without tearing the thread or mutilating the gimlet point. When the roller on the lower end of lever 123 rides up on the elevated portion of cam 128, casting 111 is moved rearwardly and, through flange 112 and the collars $59^a$ and $61^a$, moves the threading spindles rearwardly with it. During this rearward movement, means are provided for automatically holding the threading dies open, which means will be described hereinafter. To prevent the threading holders from being shot forward by the spring 125 when the threading dies are opened, I provide a stop $123^a$ for lever 123 (see Fig. 1). To reduce the friction between the collars on the spindles and flange 112, the rollers 113 are provided, which rollers permit the spindles to rotate with little friction.

The rear end of the gimlet-pointing spindle, which is in the position represented by 60, is in engagement with the cup-shaped end 134 of plunger 133, which is carried by an arm on crosshead 129. In putting the gimlet point upon the blank which has been preliminarily coned and threaded, it is necessary, in the case of short bolts, to impart two reciprocations to the spindle (and, in the case of long bolts, to impart three reciprocations thereto); also to open the gimlet-pointing device on or before the forward movements of the spindle and to close the same just before the rearward movements thereof, so that the coned end of the blank will be gimlet-pointed on the rearward movements of the spindle. At the same time, the gimlet-pointing spindle will be rotated in the left hand direction while being moved rearwardly, which will cause the threaded point thereon to form a continuation of the thread cut on the body of the blank. The construction of the gimlet-pointing device and of the means for opening and closing the same will be described hereinafter.

The spring 135 tends to force the gimlet-pointing spindle forwardly, but this action is resisted by flange 112 on draw-back member 111. A lever 149, which is pivoted to a bracket 150 supported from frame work 3, is provided at its upper end with a roller 151 which engages the rear face of collar temporarily in the position of $60^a$. A long spring 152 tends to force the upper end of the lever forwardly and thereby move the gimlet-pointing spindle forwardly.

153 denotes a stop arm supported by bracket 150. This arm is located at one side of the gimlet-pointing spindle and is in position to be engaged by its collar without engaging collar 112 on drawback member 111 when said member is in its forward position. Lever 149 is connected by means of link 154, lever 155, link 156, and rod 157 with the mechanism whereby the gimlet-pointing cutter is reciprocated two or more times while member 111 is in its forward position. The rearward movement of the gimlet-pointing spindle is caused by the left hand rotation thereof within a thrust-nut to which reference will be briefly made for the purpose of explaining the reciprocation of the spindle, particular attention being called to Figs. 1, 2, 7, 8 and 27.

The gimlet-pointing device comprises a two-part thrust nut one member 159 of which is provided with an internal thread of the same pitch as the thread which has just been cut upon the blank by the previous operation. This member is provided with a spring 160 which normally holds it away from the opposite member 161.

162 denotes a yoke one arm of which is provided with an inclined face 163 engaging a similar face on 159. By means of a link 164 connected to the inwardly-projecting end of an angle lever 165, which end is provided with a projection 166 engaging the upper end of the yoke, and by means of a link 167, arm 168, rock shaft 169, arm 170, link 171, lever 172, and cam 173 on shaft 12, the member 159 will be moved inwardly to close upon a blank whenever the end of lever 172 is in either of the two recesses provided in the cam. The end of lever 172 is so retained in said recesses by means of a spring $173^a$ connected to the outer end thereof. When the inner end of the lever is elevated by the elevated portions of the cam, member 159 will be moved outwardly. Cam 173 is so constructed and the parts are so timed that as soon as spring 152 throws the gimlet-pointing spindle to its forward limit, the member 159 will be closed against the thread on the blank. The left hand rotation of the spindle will cause the spindle to be moved backwardly against the action of spring 152, while the cutting member on holder 161 is forming a gimlet point. This action will continue as long as the inner end of lever 172 is in either of the recessed portions of the cam 173. When the inner end of lever 172 rides up on the long elevated portion of cam 173, the two parts of the nut will be held open and no further cutting will be done upon the blank. This long portion of the cam affords time for all the spindles to be drawn back and advanced another step in the cycle of operations. When cam 128 retracts member 111, the gimlet-pointing spindle is withdrawn from operative relation to its pointing device. As member 111 is moved rearwardly it rocks upper end of lever 149 rearwardly through an angular projection 111ᵃ engaging a projection 149ᵃ on the lever and holds such end of the lever back a distance to clear the spindle collars while the spindles are being shifted for the next operation. The particular manner of operating the cutter on holder 161 will be described hereinafter.

From the foregoing description, it will be apparent that means are provided for simultaneously rotating the various spindles having thereon the holders by means of which the blanks are subjected to the various operations performed by the cutting devices, that means are provided for automatically reciprocating said spindles so as to subject the blanks carried thereby to the appropriate actions of said devices and that means are provided for simultaneously retracting all of said spindles preliminarily to shifting them from one set of devices to another. I will now describe the particular construction of the holders and of the various cutting mechanisms to which each blank is subjected.

*Blank holders.*—Four such holders are shown, designated respectively 62, 63, 64 and 65. These holders are identical in construction, hence it will be necessary to describe but one of the same in detail, particular reference being made to Figs. 1, 13, 14, and 15. In the last three figures, the parts of the holder are shown in the positions which they occupy prior to the insertion of a blank thereinto. For convenience of reference, we will assume that the holder illustrated is in the position of the holder designated 62.

In Fig. 13 there is shown a front elevation of the holder; in Fig. 14 there is shown a vertical sectional view of the holder and associated parts; and in Fig. 15 a view, partly in section and partly in elevation, taken at right angles to the positions shown in Figs. 13 and 14. The front end of spindle 58 is provided with a head 174. This head is provided with a cylindrical portion 175 which merges with a tapered or conical portion 176, which in turn merges with the substantially cylindrical end portion 177. The head is provided with a bore 178 extending inwardly from the front face thereof. Within said bore there is mounted the ejector plunger 179, having intermediate of the ends thereof a head 180 which is of substantially the same diameter as the bore and centers the ejector therein.

181 denotes a spring surrounding the rear end of the plunger. The front end of the plunger extends through a nut 182 tapped into the enlarged front end of bore 178. When no blank is within the holder, the front end of the ejector plunger is nearly flush with the front end of the holder proper.

The holder proper comprises a pair of jaws 183 which are slidably mounted in a slot in the end of the spindle. The opposite sides of slot 184 form a guideway for the jaws 183.

185 denotes a pair of jaw-operating levers pivoted on pins 186 extending transversely of the spindle head. The front end of each of said levers 185 is connected to a jaw 183 by means of a bolt 187. The rear ends of levers 185 comprise each a long curved arm which extends beyond or to the rear of the spindle head, the rear ends of said arms being inwardly directed and engaging the conical surface of a sleeve 188 reciprocably mounted upon spindle 58. A pair of flat springs 189 are provided for the rearwardly extending arms of levers 185, said springs being mounted in recesses in the spindle head and tending to depress the rear ends of said levers and open the jaws 183, which action is prevented until the time when it is desirable to eject a blank by means of the conical surface of sleeve 188. It will be apparent that, should sleeve 188 be moved forwardly, springs 189 will operate to open the jaws 183. To accomplish this result, the following construction is provided:—190 denotes a pin having at its front end a head which engages a flange on the rear end of sleeve 188. Four such pins are provided, one for each spindle, each pin being reciprocably mounted in the turret head 53 with its rear end projecting a considerable distance to the rear thereof. As will appear from Figs. 29 and 30, each pin is mounted in a slot 53ᶜ in the outer surface of each bushing 53ᵇ, the flange at the front end of each bushing having a large slot for the reception of the head of the pin. 191 denotes a vertical shaft which is pivotally supported at one side of the frame. (See Figs. 2, 5 and 12.) This shaft is provided with an arm 192 which is adapted to engage the rear end of pin 190. For the purpose of rotating shaft 191 in the appropriate direction to push the pin 190 forwardly, the lower end of said shaft is provided with an arm 193, to which there is connected a long spring 194. 195 denotes a wedge-shaped member supported in the side of the frame, the lower end of said member being engaged by the rear end of lever 40 (see Fig. 24). This lever, it will be remembered, is operated by the curved lever 39 carried by shaft 31. When lever 40 is depressed by lever 39 (which is, when the roller 45 enters the recess 44 in cam 43) wedge 195 is pulled downwardly by spring 195ᵃ which connects it with lever 40 and arm 193 is free to be moved by spring 194. Arm 192 then forces pin 190 forwardly, which allows the jaws 183 to be opened by levers 185 and springs 189. For the purpose of closing the jaws, a suitable number of pins 196 are mounted within the head 174, said pins engaging the front face of sleeve 188 and, by means of springs 197, force said sleeve rearwardly as soon as permitted by the movement of the cam 43, thereby closing the jaws 183. The parts will be so timed that a blank will be brought by the carrier 33 into axial alinement with the opening between the jaws, between the ejection of a finished blank by the plunger 179 and the closing of the jaws by the mechanism described. Furthermore, the carrier will hold the blank in this position until the front end of the blank has entered the jaws, whereupon the carrier will be retracted by shaft 31.

*Blank-cutting mechanism.*—The blank-cutting mechanism comprises generally a device for coning or pointing the blank, a pair of dies for threading the body of the blank after it has been coned or pointed, a cutting device for providing the blank with a gimlet point, and a pair of dies for finishing the thread cut by the former set of threading dies. The coning device will now be described, together with the connections for automatically opening and closing the same. The coning device comprises generally an adjustable support for the side of the blank, a movable inclined knife or cutter, and means for automatically reciprocating said knife at an angle with respect to the axis of the blank.

The construction of the coning device is shown in detail in Figs. 7, 16, 21, 22, 23, 26 and 28. In these views, 198 denotes an inclined knife, the same being supported by a holder 199 having its rear or inner end supported at one side of a transverse guideway 200. This guideway merges with an inclined guideway extending toward the front of the machine at an angle of about 30 degrees with respect to the axis of the blank, which in this case is parallel with the longitudinal axis of the machine. The knife and holder are mounted in this inclined guideway. In the outer or front portion of the inclined guideway there is mounted the member 201 having its rear or inner face inclined and provided thereon with a dove-tailed projection 202. The corresponding end of the tool holder is provided with a corresponding inclined dove-tailed recess 203, whereby said holder may be reciprocated by the movement of said wedge. The tool holder is provided with a groove having therebeneath a ledge which supports the under surface of the knife 198. The top of the holder is beveled away from the front to rear, from a point slightly to the rear of the wedge 204, to provide a space for the reception of chips. The groove for the tool extends from the rear of wedge 204 to the rear or inner end of said holder, the bottom of said recess and the corresponding edge of the tool being shown in dotted lines in Fig. 22. The front end of the tool is beveled to correspond to the wedge 204 and the inner face of the tool is provided with a recess 205 for the reception of a pin 206 carried by the holder. The front end of said pin is inclined and coöperates with a correspondingly inclined surface of the knife or tool, whereby said knife is securely locked in place when the screw 207 is set up.

Figure 7:
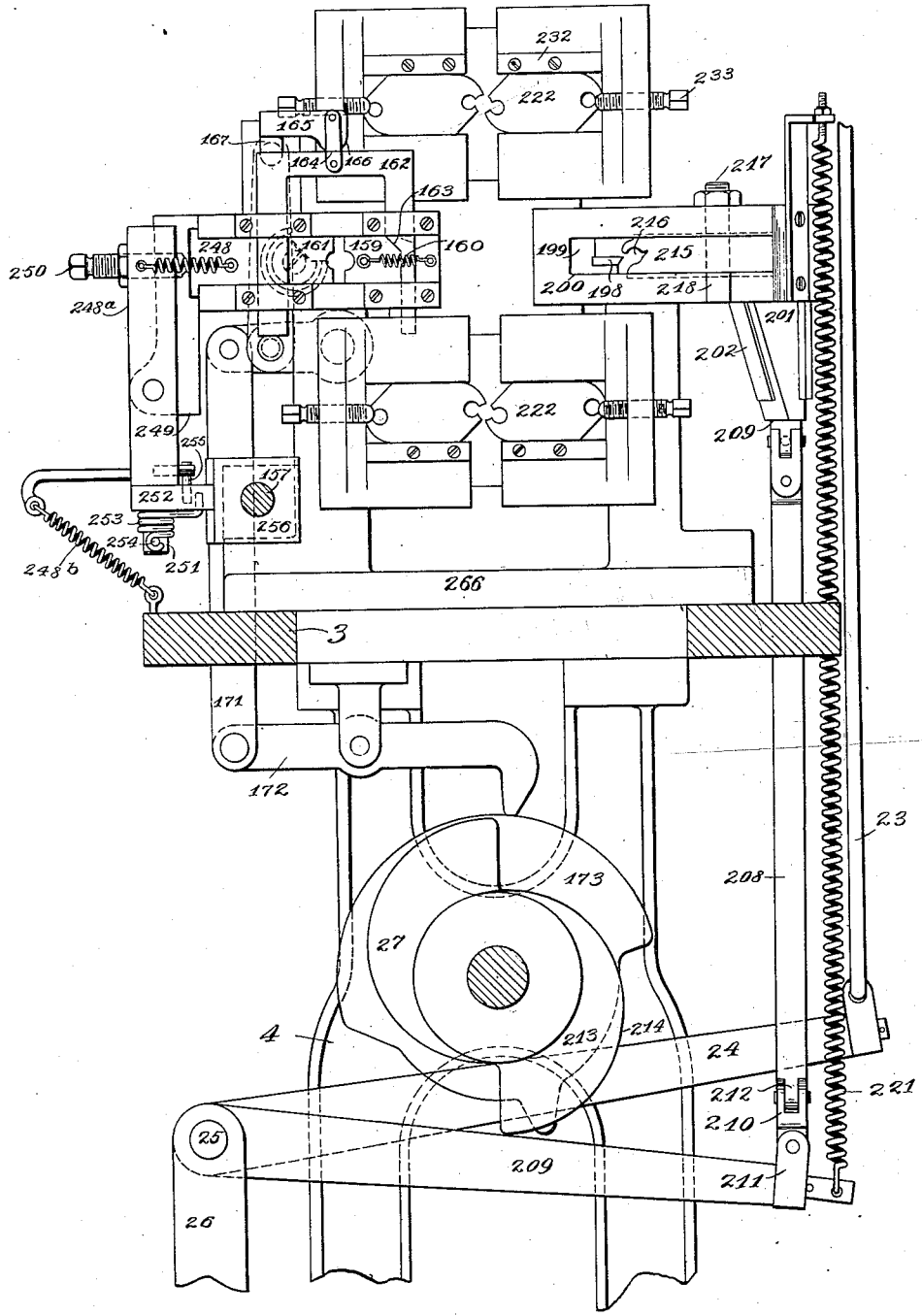

Member 201 is operated from shaft 12 by means of a link 208 pivotally connected to a lug 209 on the bottom of the wedge, said link being connected at its lower end to a lever 209 extending transversely of the machine and being pivoted to shaft 25. Link 208 is connected with lever 209 by a style of universal joint consisting of a link 210 having its opposite ends pivotally connected, at right angles with each other, to a strap 211 carried by lever 209 and to a lug 212 on the bottom of link 208. Lever 209 is operated by a cam 213 on shaft 12. This cam is provided with a long spiral operating surface 214. By this construction, member 201 is gradually depressed to force the tool or knife 198 diagonally across the end of the rotating blank. The member 201 is elevated, after passing off the surface 214 of the cam by means of a long spring 221 connected with the end of lever 209. The thrust of the knife against the side of the blank is taken up during this operation by a chuck member 215, which is mounted in the slideway 200 and is provided with a rounded recess 216 at one end thereof against which the body of the blank will bear. Member 215 is adjustably locked in position by means of a bolt 217 having a rearwardly projecting portion 218 provided with a recess for the reception of the downwardly projecting portion 219 of member 215 and with an upwardly extending projection 220 fitting in a corresponding longitudinal groove in 215. This construction is shown in Figs. 7, 16 and 23.

The preliminary and finishing threading dies comprise each a pair of reversible die members 222. These die members are substantially identical in construction and are each provided with means whereby the members of each set may be automatically opened to permit the withdrawal of the blank therefrom after the blank has been threaded and to be automatically closed thereafter. The only difference between the two sets of threading dies is that the finishing dies deepen the groove between the threads cut by the other dies and trim and point the crown of the thread. It will be noted, by reference to Fig. 7, that the cutting surfaces of these dies are arranged at a different angle from that ordinarily employed with such dies. The cutting edges of each die member are substantially in the same vertical plane and are equidistant from the center of the aperture therebetween. The cutting edges of the die members engage the bolt or blank at the same distance above and below the center, which results in cutting a smooth thread without any tendency to tear the same.

As previously stated, the threading dies are automatically opened to permit the withdrawal of the blanks therefrom by the spindles, after said spindles have reached their As previously stated, the threading dies are automatically opened to permit the withdrawal of the blanks therefrom by the spindles, after said spindles have reached their forward limit of movement. This result is accomplished by means of the construction illustrated in Figs. 1, 2 and 16. 223 denotes a sliding member mounted in a suitable guideway 224 on a bracket 225 supported by frame-work 3. The inner end of this slide is provided with inclined surfaces 226 adapted to engage the outer ends of a pair of levers 227, pivoted to said bracket at 228. The outer ends of these levers are each provided with an inclined surface 229 adapted to be engaged by the inclined surfaces 226, and said outer ends are connected by a spring 230 which tends to draw such ends together against the action of the slide 223. The inner ends of these levers are rounded and are fitted in apertures in a pair of sliding blocks 231 which are mounted on top of bracket 225. The die members 22 are mounted in guideways 232 in said blocks and are independently adjustable therein by means of adjusting screws 233. 243 denotes a vertical cross-head having a hub 235 mounted on a suitable guide rod 236. Each end of cross-head 234 is provided with a sleeve 237 which receives the outer or front end of a rod 238 connected at its inner or rear end to slide 223.

It will be understood that both sets of threading dies are provided with similar sliding blocks 231 and with similar longitudinal slides 223; hence, the description of the upper slide and its connections will suffice for both slides. Each rod 238 is provided with an adjustable stop collar 239 between which and sleeve 237 there is interposed a spring 240, and the front or outer end of each rod 238 is provided with a similar stop collar 241. There is thus provided a yielding connection between cross-head 235 and rods 238, whereby said rods may be pushed inwardly against a yielding resistance which will prevent the breaking of the parts in case it should happen that a blank remains in either of the dies during the closing movement thereof. A stop 242, (see Fig. 16) limits the inward or rearward movement of each slide 223.

For the purpose of automatically operating the cross-head 234 and the dies connected therewith, I provide shaft 12 with a pair of cams 243 and 244, each of said cams being provided with a projection, 243ª and 244ª, respectively, shown as located about 180 degrees apart and adapted to alternately engage a roller on the lower end of the vertical lever 245 pivoted to the front end of frame work 3. The upper end of this lever is connected with a rod 246 which is threaded through the front end of a yoke 247 pivotally connected to opposite sides of hub 235. With this construction, it will be apparent that the dies will be closed by projection 244ª on cam 244 and will remain closed until opened by projection 243ª on cam 243. The projection 243ª will be of sufficient extent to permit the blank to be threaded the desired length before the dies are automatically opened. The parts are so arranged that lever 245 will remain in the position in which it is left by one of the cam projections before it will be operated in a reverse direction. The cams 243 and 244 are angularly adjustable with respect to shaft 12 to accommodate different lengths of threads.

The gimlet-pointing die or cutter has been described in part in connection with the operation of spindle 60. As previously stated, the thrust nut of the gimlet-pointing device comprises a movable member 159, which is provided with an internal thread of the same pitch as the thread already on the body of the blank fed thereto, and a smooth fixed member 161. Member 159 is provided with a spring 160 and is operated toward and from the opposite member 161 of the nut by means of the wedge on yoke or saddle 162 and said spring, said yoke or saddle being reciprocated by cam 173 in the manner described hereinbefore. The opposite arm of the yoke or saddle forms an abutment for member 161. While member 161 is fixed, means are provided for moving the holder for the gimlet-point cutter inwardly to cause the cutter thereon to engage the tapered end of the blank as the latter is withdrawn from the thrust nut. This keeps the cutter in contact with the conical end of the blank during the retrograde movement thereof. For the purpose of so operating the holder 248, which is mounted in guideways, a vertical lever 248ª pivoted to a bracket 249 is provided, said lever having at its upper end an adjustable screw 250, the inner end whereof is adapted to engage the outer end of the holder 248. This lever is provided with a downwardly projecting stud or shank 251, on which there is mounted an inwardly-projecting operating arm 252, having its inner extremity rounded, (see Figs. 7 and 8).

253 denotes a spiral spring coiled around stud 251 and having one end thereof fastened to a pin 254 projecting from said stud and its opposite end projecting into a recess in the lower surface of arm 252.

255 denotes a downwardly projecting stop carried by lever 248ᵃ and projecting into a recess in said arm. The lever thus constructed is operated from lever 149 and spring 152 through link 154, lever 155, link 156, and rod 157, hereinbefore referred to. On rod 157 there is mounted a wedge block 256. This block has its widened end presented forwardly. In operation, a spring 152 and lever 149 move spindle 60 forwardly, the front end of wedge block 256 engages arm 252 and rocks the same against the action of spring 253, until it clears said arm, which arm is then returned to its normal position, being arrested against further movement by stop 255. As spindle 60 is moved rearwardly by the next member 159 hereinbefore described, the inclined surface of wedge 256 rocks lever 248ᵃ, throwing the upper end inwardly and feeding holder 248 inwardly, forcing the cutter against the tapered end of the blank. The taper or inclination of the wedge block 256 governs the shape and depth of the thread cut by the gimlet-pointing tool. A spring 248ᵇ connected to the framework 3 and projecting from lever 248ᵃ moves the holder 248 outwardly after the wedge block disengages arm 252.

In Figs. 17, 18 and 19, I have shown the construction of the cutting tool which forms the gimlet point. This cutting tool is carried at the inner end of the holder 248, and comprises a frusto-conical body 257 provided on the exterior thereof with several parallel corrugations or threads 258. A portion of the periphery of this tool is cut out as shown at 259 to provide clearance for the chips and a cutting edge for the tool.

As will appear from Fig. 20, which represents a bottom plan view of the cutter, it will be seen that the cutter is provided with a series of radial corrugations 260 adapted to engage corresponding radial recesses 261 on the disk 262 carried by the tool holder. This disk is provided with a pair of holes 263 for the reception of a pin 264. One of these apertures extends through the groove of a corrugation and the other through a ridge, and is adapted to engage a corrugation on the base of the cutter to prevent rotation thereof. The tool is secured to disk 262 by means of a bolt 265. As the edge of the cutter becomes worn, it will be necessary to grind away only an amount of the cutter body equal to half the width of a corrugation. For instance, if the corrugations are 1/16″ wide, it will be necessary to grind away only 1/32″ of the body of the cutter in sharpening the same. The cutting tool 257 is mounted in a recess in the inner end of the holder 248 at the rear of nut member 161 and has its rear face substantially flush with the rear face of the holder. As will appear from Fig. 27, nut member 159 is longer than member 161, providing at its rear portion a thrust bearing for the blank while it is being operated upon by the cutter 257.

In order to accommodate the machine for blanks of various lengths, the tool block 266 which carries the various cutting devices is adjustable on framework 3 toward and from the turret-head bearing 51. For the same reason, carrier 33 is longitudinally adjustable along its shaft 31, through a long keyway on said shaft to which arm 32 is keyed.

To prevent the rotation of the drawback member 111 on the shaft 55ᵃ, I provide flange 115 with a rearwardly projecting pin 115ᵇ which extends through a slot in the lever 123, as shown in Figs. 1 and 10. Furthermore, when said member 111 is in its rearmost position, the rear ends of the spindles clear slightly the sockets provided therefor in member 111 and cross-head 129, enabling the turret heads to be rotated a quarter revolution without any hindrance by the engagement of the spindles with their sockets. Fig. 9 shows the position occupied by the end of the finishing-threading spindle when working.

Having described my invention, I claim:

1. In a machine of the character set forth, the combination of a coning device, and preliminary-threading, gimlet-pointing and finishing-threading devices adapted to be opened and closed to operate upon a blank, all of said devices being arranged around a common center and equidistant therefrom, a plurality of blank holders corresponding in number and arrangement with said devices, spindles for said holders, a support for said spindles, means for rotating said spindles, means for imparting intermittent rotary movement to said support to bring the holders successively in operative relation to said devices, means for automatically causing said holders successively to receive a blank and to eject a finished blank, means for subjecting the blanks in the holders successively to the operation of the aforesaid devices, and means for automatically opening and closing the threading and gimlet-pointing devices, substantially as specified.

2. In a machine of the character set forth, the combination of coning, preliminary-threading, gimlet-pointing and finishing-threading devices arranged around a common center and equidistant therefrom, a plurality of blank holders corresponding in number and arrangement with said devices, spindles for said holders, a support for said spindles, means for rotating said spindles, means for imparting intermittent rotary movement to said support to bring the holders successively in operative relation to said devices, means for automatically reciprocating said spindles and the holders thereon toward and from the aforesaid devices, means for automatically supplying blanks to said holders successively prior to the coning operation, means for automatically ejecting the finished blanks from said holders successively after the finishing-threading operation, means for causing the coning and threading devices to operate upon the corresponding blanks during the movement of the holders toward the same, and means for causing the gimlet-pointing device to operate upon the corresponding blank during the reverse movement of the holder corresponding thereto, substantially as specified.

3. In a machine of the character set forth, the combination of coning, preliminary-threading, gimlet-pointing, and finishing-threading devices arranged around a common center, a rotary support, a plurality of holders corresponding to said devices and carried by said support, means for supplying blanks to said holders, means for intermittently rotating said support to bring the holders thereon successively in alinement with each of the aforesaid devices, spindles mounted in said support and each connected to a holder, means for reciprocating said spindles toward and from said devices during an inactive period of said support, means for rotating said spindles during such period, means for automatically opening each holder after it has been brought opposite the finishing-threading device, means for ejecting a blank therefrom, means for automatically supplying a new blank thereto, and means for causing the holder to automatically close on said blank, substantially as specified.

4. In a machine of the character set forth, the combination of coning, preliminary-threading, gimlet-pointing, and finishing-threading devices arranged around a common center, a rotary support, a plurality of holders corresponding to said devices and carried by said support, means for supplying blanks to said holders, means for intermittently rotating said support to bring the holders thereon successively in alinement with each of the aforesaid devices, spindles mounted in said support and each connected to a holder, means for reciprocating said spindles toward and from said devices, means for rotating said spindles, means for automatically opening each holder after it has been brought opposite the finishing-threading device, means for ejecting a blank therefrom, means for automatically supplying a new blank thereto, and means for causing said holder to automatically close on said blank, substantially as specified.

5. In a machine of the character set forth, the combination of coning, preliminary-threading, gimlet-pointing, and finishing-threading devices arranged around a common center, a rotary support, a plurality of holders corresponding to said devices and carried by said support, means for supplying blanks to said holders, means for intermittently rotating said support to bring the holders thereon successively in alinement with each of the aforesaid devices, means for imparting to the holder temporarily in alinement with the gimlet-pointing device a plurality of reciprocations, and means for imparting to the remaining holders a single reciprocation, substantially as specified.

6. In a machine of the character set forth, the combination of a plurality of cutting devices arranged around a common center, a plurality of blank holders also arranged around a common center, a spindle connected with each of said holders, a rotary support for said spindles, intermeshing gears on said spindles, a drive shaft having thereon a gear adapted to mesh successively with the spindle gears, and means for intermittently rotating said support to bring each spindle gear successively in mesh with the gear on the driving shaft, substantially as specified.

7. In a machine of the character set forth, the combination of a plurality of cutting devices arranged around a common center, a plurality of blank holders also arranged around a common center, a spindle connected with each of said holders, a rotary support for said spindles, intermeshing gears on said spindles, a drive shaft having thereon a gear adapted to mesh successively with the spindle gears, means for intermittently rotating said support to bring each spindle gear successively in mesh with the gear on the drive shaft, and means for automatically reversing the rotation of said gears during the intermittent rotary movement of the support, substantially as specified.

8. In a machine of the character set forth, the combination of a plurality of chucks arranged around a common center, a spindle connected with each of said chucks, a rotary support for said spindles, means for intermittently rotating said support, driving means adapted to engage each spindle successively to rotate the same, driving connections between said spindles, whereby they are driven consecutively in reverse directions, and means for automatically reversing the rotation of the spindles during the intermittent rotation of the support, substantially as specified.

9. In a machine of the character set forth, the combination of an even number of tools arranged around a common center, a plurality of blank holders also arranged around such common center and corresponding in number and arrangement to said cutting devices, a spindle for each of said holders, a rotary support for all of said spindles, intermeshing gears on said spindles, a drive shaft, a driving gear thereon adapted to mesh with the gears on said spindles successively, means for intermittently rotating said support the distance between a pair of spindles, and means driven by the drive shaft for automatically reversing the rotation of said spindles during the intermittent rotary movement of said support, substantially as specified.

10. In a machine of the character set forth, the combination of a plurality of tools arranged around a common center, a rotary support, a plurality of spindles mounted in said support and arranged around such common center, intermeshing gears on said spindles, a drive shaft having a gear adapted to mesh with the spindle gears successively, a pulley on each of said spindles, a pulley on said drive shaft, a pulley arranged on the opposite side of the rotary support from said drive-shaft pulley, and a belt extending around the last mentioned pulleys and adapted to engage the pulleys on the spindles, substantially as specified.

11. In a machine of the character set forth, the combination of a rotary support, a plurality of tools arranged around a common center, a plurality of spindles mounted in said support and arranged around such common center, intermeshing gears on said spindles, a drive shaft having a gear adapted to mesh with the spindle gears successively, a pulley on each of said spindles, a pulley on said drive shaft, a pulley arranged on the opposite side of the rotary support from said drive shaft pulley, and a belt extending around the last mentioned pulleys and engaging the pulleys on the top and bottom spindles, substantially as specified.

12. In a machine of the character set forth, the combination of four tools arranged around a common center and 90 degrees apart, a rotary support having four spindles mounted therein and at an angular distance of 90 degrees apart, means for rotating said support intermittently a distance of 90 degrees, intermeshing gears on said spindles, a pulley on each of said spindles, a drive shaft located at one side of said support and having thereon a drive gear adapted to mesh successively with the spindle gears, a pulley on the drive shaft, a pulley on the opposite side of the support from the drive shaft, and a belt extending around the last two pulleys and the pulleys on the top and bottom spindles, substantially as specified.

13. In a machine of the character set forth, the combination of a rotary support having an even number of spindles mounted therein equidistant apart and equidistant from the center of said support, means for rotating said support intermittently the angular distance between a pair of spindles, intermeshing gears on said spindles, a pulley on each of said spindles, a drive shaft located at one side of said support and having thereon a drive gear adapted to mesh successively with the spindle gears, a pulley on the drive shaft, a pulley on the opposite side of the support from the drive shaft, and a belt extending around the last two pulleys and the pulleys on the top and bottom spindles, substantially as specified.

14. In a machine of the character set forth, the combination of a plurality of tools arranged around a common center, a plurality of similarly arranged blank holders, a rotary support therefor, means for rotating said blank holders, and means for automatically rotating the support the angular distance between a pair of adjacent tools, said means comprising a shaft connected with the rotary support, an operating shaft, connections between said shafts for automatically rotating the former shaft the aforesaid distance, and means for locking the former shaft against rotation, substantially as specified.

15. In a machine of the character set forth, the combination of a plurality of tools arranged around a common center and equidistant therefrom and from each other, a plurality of similarly arranged blank holders, a rotary support therefor, means for rotating said blank holders, and means for automatically rotating the support the angular distance between a pair of adjacent tools, said means comprising a shaft connected with the rotary support, a continuously rotating shaft, a pawl-and-ratchet connection between said shafts, a locking device for preventing the rotation of the former shaft, and means controlled by the rotation of the latter shaft for temporarily putting the locking device out of operation, substantially as specified.

16. In a machine of the character set forth, the combination of a plurality of tools arranged around a common center and equidistant therefrom and from each other, a plurality of similarly arranged blank holders, a rotary support therefor, means for rotating said blank holders, and means for automatically rotating the support the angular distance between a pair of adjacent tools, said means comprising a shaft connected with the rotary support, a rotary shaft adjacent thereto, connections whereby the rotation of the latter shaft automatically imparts an intermittent rotation to the former shaft, a pawl normally locking the former shaft against rotation, and a cam carried by the latter shaft and arranged to trip said pawl, substantially as specified.

17. In a machine of the character set forth, the combination of a plurality of tools, a plurality of blank holders corresponding thereto, a rotary support, a spindle for each of said holders mounted in said support, a shaft for rotating said support, a draw-back member loosely mounted on said shaft, means for moving said member and said spindles toward said tools, a second shaft, connections between said shafts for automatically and intermittently rotating the former shaft by the latter, means operated by the latter shaft for automatically moving the draw-back member away from said tools, and means carried by said member and operatively engaging said spindles to move the same away from said tools, substantially as specified.

18. In a machine of the character set forth, the combination of a plurality of tools, a plurality of blank holders corresponding thereto, a rotary support, a spindle for each of said holders slidably mounted in said support, a shaft for rotating said support, a draw-back member loosely mounted on said shaft and having thereon a collar, means for moving said member and said spindles toward said tools, a second shaft, a connection between said shaft and said member for moving the same rearwardly, collars on said spindles adapted to be operatively engaged by the collar on said member on the rearward movement of the latter, and means for rotating said spindles, substantially as specified.

19. In a machine of the character set forth, the combination of a plurality of tools, a plurality of blank holders corresponding thereto, a rotary support, a spindle for each of said holders slidably mounted in said support, a shaft for rotating said support, a draw-back member loosely mounted on said shaft and having thereon a plurality of rollers, means for moving said member and said spindles toward said tools, a connection between said shaft and said member for moving the same rearwardly, means on said spindles adapted to be engaged by the rollers on said member on the rearward movement of the latter, and means for rotating said spindles, substantially as specified.

20. In a machine of the character set forth, the combination of a plurality of tools, a plurality of blank holders corresponding thereto, a rotary support, a spindle for each of said holders slidably mounted in said support, a shaft for rotating said support, a draw-back member loosely mounted on said shaft and having a pair of oppositely-extending projections adapted to engage the rear ends of the corresponding spindles, a second member loosely mounted on said shaft and having means for engaging the rear ends of the other spindles, means for moving said members independently toward the tools, means for moving said members simultaneously away from said tools, and means carried by the former member for retracting all of said spindles, substantially as specified.

21. In a machine of the character set forth, the combination of a plurality of tools, a plurality of blank holders corresponding thereto, a rotary support, a spindle for each of said holders slidably mounted in said support, a shaft for rotating said support, a draw-back member loosely mounted on said shaft and having means adapted to engage some of said spindles to advance the same toward said tools, a movable member mounted on said shaft at the rear of the former member and engaging the rear ends of the other spindle, means for moving the aforesaid members toward said tools, means for automatically retracting the former member, and means carried by said member and adapted to engage all of said spindles to move the same rearwardly, substantially as specified.

22. In a machine of the character set forth, the combination of a plurality of tools, a plurality of blank holders corresponding thereto, a rotary support, a spindle for each of said holders slidably mounted in said support, a shaft for rotating said support, a draw-back member loosely mounted on said shaft and having means adapted to engage the rear ends of some of said spindles, a member mounted on said shaft at the rear of the former member and having means adapted to engage the remaining spindles and force the same forwardly, means for moving the former member forwardly, independent means for moving the latter member forwardly, means for moving the former member rearwardly, and means carried by the last mentioned member for moving the spindles rearwardly therewith, substantially as specified.

23. In a machine of the character set forth, the combination of coning, preliminary-threading, gimlet-pointing, and finishing-threading devices, a plurality of holders corresponding to said devices, a spindle connected with each of said holders, means engaging said spindles and adapted to reciprocate the same toward and from the aforesaid devices, and connections whereby the holder corresponding to the gimlet-pointing device will be reciprocated a plurality of times for a single reciprocation of each of the other spindles, substantially as specified.

24. In a machine of the character set forth, the combination of a plurality of tools arranged around a common center and equidistant therefrom, a plurality of blank-holders arranged around a common center in alinement with the center of the tools and each located the same distance from said center as the tools, means for automatically and intermittently rotating said holders around their center a distance equal to the distance between adjacent tools, means for reciprocating said holders toward and from said tools, a carrier, means for automatically reciprocating said carrier between the holders and the tools during an inactive period of the holder-rotating means, and means for causing each holder successively to receive a blank from the carrier, substantially as specified.

25. In a machine of the character set forth, the combination of a plurality of tools arranged around a common center and equidistant therefrom, a plurality of blank-holders arranged around a common center in alinement with the center of the tools and each located the same distance from said center as the tools, means for automatically and intermittently rotating said holders around their center a distance equal to the distance between adjacent cutting devices, means for reciprocating said holders toward and from said tools, a carrier, means for automatically reciprocating said carrier between the holders and the tools during an inactive period of the holder-rotating means, means for causing each holder successively to receive a blank from the carrier, and blank-ejecting means for each holder, substantially as specified.

26. In a machine of the character set forth, the combination of a tool, a blank holder, means for supplying blanks to said holder, and means for causing said holder to engage and disengage said blank, said means comprising a pair of movable jaws, levers connected thereto, a shaft, means controlled by said shaft for reciprocating said holder toward and from said device, and means also controlled by said shaft for operating said levers, substantially as specified.

27. In a machine of the character set forth, the combination of a tool, a blank-holder, a shaft, means controlled by said shaft for moving said holder toward and from said tool, and means controlled by said shaft for automatically causing said holder to engage and disengage a blank, substantially as specified.

28. In a machine of the character set forth, the combination of a tool, a blank-holder, a shaft, means controlled by said shaft for moving said holder toward and from said tool, means controlled by said shaft for automatically supplying blanks in operative relation to said holder, and means controlled by said shaft for causing the holder to engage and disengage a blank supplied thereto, substantially as specified.

29. The combination, with a blank-holder comprising a pair of jaws, of a lever pivoted intermediate its ends and having one end connected to a jaw, and a spring engaging the lever arm on the side of the pivot opposite said jaw, of an inclined member supporting the end of said lever which is remote from said jaw, a shaft for reciprocating said holder, and means controlled by said shaft for moving said inclined member, substantially as specified.

30. In a machine of the character set forth, the combination of a cutting device, a spindle, a blank-holder thereon having a pair of movable jaws adapted to be brought into engagement with a blank, a shaft, and means for opening and closing said jaws, said means comprising a pair of levers connected each with one of said jaws, an inclined sleeve mounted on said spindle and engaging said levers, connections whereby the rotation of said shaft moves said sleeves in one direction, and means carried by said spindle for moving said sleeve in the opposite direction, substantially as specified.

31. In a machine of the character set forth, the combination of a blank-holder, and means for automatically causing the holder to engage and disengage a blank, said means comprising a pair of jaws, means tending to open said jaws, a sleeve on said spindle resisting the action of such jaw-opening means, and means for moving said sleeve, said means comprising a shaft having an operating arm, a rod adapted to engage said sleeve, means for automatically rotating said shaft to cause said arm to operate said rod, and one or more spring-pressed rods carried by said spindle and adapted to move said sleeve in a reverse direction, substantially as specified.

32. In a machine of the character set forth, the combination of a spindle, a pair of jaws carried by said spindle, and means for opening and closing said jaws, said means comprising a sleeve mounted on said spindle, an operating rod for said sleeve, a rock shaft, an arm carried thereby and adapted to engage said rod, a spring tending to rock said shaft in one direction, a second shaft, a cam carried thereby, a lever engaging said cam, and means connecting said lever and the first-mentioned shaft, substantially as specified.

33. In a machine of the character set forth, the combination of a spindle, a pair of jaws mounted thereon, means for opening and closing said jaws, said means comprising a member reciprocably mounted on said spindle, one or more spring-pressed rods carried by said spindle and engaging said member, a rod engaging said member and adapted to operate the same against the action of the former rod or rods and means for moving the latter rod, said means comprising a rock shaft having an arm, a spring tending to rock said shaft in a direction to bring said arm against said rod, a reciprocable member arranged to block the rotation of said shaft by said spring, a second shaft, a cam carried thereby, and a lever engaging said cam and adapted to operate the reciprocable member, substantially as specified.

34. In a machine of the character set forth, the combination of a spindle, a pair of jaws mounted thereon, means for opening and closing said jaws, said means comprising a member reciprocably mounted on said spindle, one or more spring-pressed rods carried by said spindle and engaging said member, a rod engaging said member and adapted to operate the same against the action of the former rod or rods, and means for moving the latter rod, said means comprising a rock shaft having an operating arm for said rod and a second arm, a spring connected with one of said arms and tending to rock said shaft in a direction to bring said arm against said rod, a reciprocable wedge-shaped member arranged to engage the second arm and block the rotation of said shaft by said spring, a second shaft, a cam carried thereby, and a lever engaging said cam and adapted to operate the reciprocable member, substantially as specified.

35. In a machine of the character set forth, the combination of a spindle having a head provided with guideways, a pair of jaws mounted in said guideways, a pair of levers having their front ends connected to said jaws and pivoted to said spindle head, springs engaging said levers at the rear of their pivotal points and tending to open said jaws, an inclined sleeve mounted on the spindle and engaging the rear ends of the levers, means carried by the spindle head for operating said sleeve in one direction, and means for automatically operating the sleeve in the opposite direction, substantially as specified.

36. In a machine of the character set forth, the combination of a plurality of blank-holders, spindles for said holders, a pair of turret heads in which said spindles are mounted, one of said turret heads having a recessed face, an integral reduced shaft connecting said turret heads, a larger shaft having a flange fitted in the recessed face of one of the turret heads, and means for intermittently rotating the latter shaft, substantially as specified.

37. In a machine of the character set forth, the combination of a plurality of blank holders, a spindle for each holder, a turret head for said spindles, said turret head being provided with bushings for said spindles, each of said bushings having a longitudinal recess in the wall thereof, a rod mounted in each recess, and means for causing each holder to engage and disengage a blank, said means comprising a member mounted on each spindle and in position to be operated by a rod, a shaft, an arm carried thereby, and means for automatically rocking said shaft to bring said arm successively into engagement with the rearwardly projecting portions of said rods, substantially as specified.

38. In a machine of the character set forth, the combination of a blank-holder, a spindle for said holder, a turret head for said spindle, said turret head being provided with a bushing for said spindle, said bushing having a longitudinal recess in the wall thereof, a rod mounted in said recess, and means for causing said holder to engage and disengage a blank, said means comprising a member mounted on each spindle and in position to be operated by a rod, a shaft, an arm carried thereby, and means for automatically rocking said shaft to bring said arm into engagement with the rearwardly projecting portion of said rod, substantially as specified.

39. In a machine of the character set forth, the combination of coning, threading, and gimlet-pointing devices, a blank-holder, means for bringing said holder successively into operative relation to each of said devices, means for reciprocating said holder when opposite the coning and threading devices, and means for imparting to said holder while opposite the gimlet-pointing device a plurality of reciprocations, substantially as specified.

40. In a machine of the character set forth, the combination of coning, threading, and gimlet-pointing devices, a plurality of holders corresponding to said devices, means for bringing said holders successively in operative relation to said devices, means for imparting to the holder which is opposite the gimlet pointing device a plurality of reciprocations, and means for imparting to the other holders a single reciprocation, substantially as specified.

41. In a machine of the character set forth, the combination of a threading and a gimlet-pointing device, a pair of blank holders, a spindle for each of said holders, means for moving said holders successively into alinement with the aforesaid devices, means for automatically reciprocating said spindles toward and from said devices, means for reversing the rotation of said spindles at each of said devices, and means whereby the thread and the gimlet point will be applied to the blanks by the reciprocation of the spindle in reverse directions, substantially as specified.

42. In a machine of the character set forth, the combination of threading and gimlet-pointing devices, blank holders corresponding to said devices and each adapted to hold a blank, means for moving the holders successively into alinement with the said devices to cut a thread upon the body and upon the point of the blank, means tending to move forward the holder which is in alinement with the gimlet-pointing device, means for rotating the spindle of said device, and means for reversing the reciprocation of said spindle, said means comprising a two-part nut, and means for automatically opening and closing the same upon the threaded body of the blank, substantially as specified.

43. In a machine of the character set forth, the combination of coning and gimlet-pointing devices, a pair of holders corresponding thereto, rotary spindles connected with said holders, means for moving said holders and spindles successively into alinement with the aforesaid devices, a cross-head for operating said spindles, said cross-head having a pair of projections for the ends of said spindles, a yielding connection between one of said spindles and one of said projections, and means for reciprocating said cross-head, substantially as specified.

44. In a machine of the character set forth, the combination of coning and gimlet-pointing devices, a pair of holders corresponding thereto, rotary spindles connected with said holders, means for moving said holders and spindles successively into alinement with the aforesaid devices, and a cross head for operating said spindles, said cross-head having a pair of projections for the ends of said spindles, a yielding connection between one of said spindles and one of said projections, means for reciprocating said cross-head, and means for independently reciprocating the spindle having the yielding connection with the cross-head, substantially as specified.

45. In a machine of the character set forth, the combination of coning and gimlet-pointing devices, a pair of holders corresponding thereto, rotary spindles connected with said holders, means for moving said holders and spindles successively into alinement with the aforesaid devices, a cross-head having projections for moving said spindles, one of said projections having a yielding connection with one of said spindles, means for moving the latter spindle independently of the cross-head, and means adapted to engage the blank carried by the holder on the latter spindle to move said spindle in the opposite direction, substantially as specified.

46. In a machine of the character set forth, the combination of coning and gimlet-pointing devices, a pair of holders corresponding thereto, rotary spindles connected with said holders, means for moving said holders and spindles successively into alinement with the aforesaid devices, a member for moving said spindles toward their respective devices, a yielding connection between said member and the spindle which is in alinement with the gimlet-pointing device, a lever operatively connected with said spindle, a spring connected with said lever and tending to move the spindle toward said device, means for rotating said spindle, and a device arranged to retract said spindle against the action of the spring, substantially as specified.

47. In a machine of the character set forth, the combination of a preliminary-threading device and a finishing-threading device, a pair of blank-holders, means for moving said holders toward and from said threading devices, and connections whereby the blank holder corresponding to the preliminary threading device is moved in advance of the other holder, substantially as specified.

48. In a machine of the character set forth, the combination of a preliminary-threading device and a finishing threading-device, a pair of blank-holders, spindles connected thereto, means for moving said holders to bring the same successively into operative relation to said devices, means for rotating said spindles, and a device for moving said spindles simultaneously toward said threading devices, there being a yielding connection between the last named device and the spindle which is in alinement with the finishing-threading device, substantially as specified.

49. In a machine of the character set forth, the combination of a pair of threading devices, a pair of blank holders, spindles connected thereto, means for moving said holders and spindles to bring the same successively into operative relation to said threading devices, a movable member having a pair of projections for said spindles, and a yielding connection between one of said projections and one of said spindles, substantially as specified.

50. In a machine of the character set forth, the combination of a pair of threading devices, a pair of blank holders, spindles connected thereto, means for moving said holders and spindles to bring the same successively into operative relation to said threading devices, a movable member having a pair of projections for said spindles, a yielding connection between one of said projections and one of said spindles, and means carried by said member for withdrawing said spindles from said devices, substantially as specified.

51. In a machine of the character set forth, the combination of coning and gimlet-pointing devices, blank-holders corresponding thereto, spindles connected with said holders, means for rotating said spindles, and means for reciprocating said spindles, said means comprising a cross-head having oppositely projecting arms, a yielding connection between one of said arms and one of said spindles, and means for automatically reciprocating said crosshead, substantially as specified.

52. In a machine of the character set forth, the combination of a preliminary-threading device and a finishing-threading device each comprising a pair of die members, a pair of blank-holders, a shaft, means controlled by said shaft for moving said holders toward and from said devices successively, and means controlled by the movement of said shaft for automatically opening and closing said die members, substantially as specified.

53. In a machine of the character set forth, the combination of a pair of threading devices, each comprising a pair of die members, a blank holder, means for moving said holder toward and from said devices successively, and means for opening and closing the die members of each device, said means comprising a rod operatively connected with each pair of die members, a cross-head connected to said rods, a shaft, and a connection between said shaft and said cross-head, substantially as specified.

54. In a machine of the character set forth, the combination of a pair of threading devices, each comprising a pair of die members, a blank holder, means for moving said holder toward and from said devices successively, and means for opening and closing the die members of each device, said means comprising a rod operatively connected with each pair of die members, a crosshead, said crosshead having its opposite ends sleeved on said rods, a collar on each rod, a spring interposed between the crosshead sleeve and the collar on each rod, a shaft, and an adjustable connection between said crosshead and said shaft, substantially as specified.

55. In a machine of the character set forth, the combination of a pair of threading devices, each comprising a pair of die members, a blank-holder, means for moving the same toward and from said devices, a shaft, and connections between said shaft and the die members of each device for automatically opening and closing the same, said connections comprising a pair of cams on said shaft, a lever pivoted intermediate of its ends and having one end adapted to be engaged by said cams, a crosshead, yielding connections between said crosshead and each set of die members, and an adjustable connection between said crosshead and said levers, substantially as specified.

56. In a machine of the character set forth, the combination of a pair of threading devices, each comprising a pair of die members, a blank-holder, means for moving said holder toward and from said devices successively, and means for opening and closing the die members of each device, said means comprising a rod operatively connected with each pair of die members, a crosshead yieldingly connected to said rods, a shaft, and an adjustable connection between said shaft and said crosshead, substantially as specified.

57. In a machine of the character set forth, the combination of a gimlet-pointing device, a blank-holder, a rotary spindle connected thereto, means for threading the body of said blank, yielding means forcing said spindle toward said device, and means operative by the rotation of the spindle for moving the holder rearwardly, said means comprising a nut having a thread therein corresponding to the thread on the body of the blank, and means for automatically bringing the nut into engagement with the threaded surface of the blank a plurality of times, substantially as specified.

58. In a machine of the character set forth, the combination of a gimlet-pointing device, a blank-holder, a rotary spindle connected thereto, means for threading the body of said blank, yielding means forcing said spindle toward said device, and means operative by the rotation of the spindle for moving the holder rearwardly, said means comprising a nut, said nut being made of two parts, one part being threaded and the other smooth, the threaded part projecting beyond the smooth part and overhanging the gimlet-pointing device, and means for automatically opening and closing said nut upon the threaded body of the blank, substantially as specified.

59. In a machine of the character set forth, the combination of a gimlet-pointing device, a blank-holder, a rotary spindle connected thereto, means for threading the body of said blank, yielding means forcing said spindle toward said device, and means operative by the rotation of the spindle for moving the holder rearwardly, said means comprising a nut, said nut being located between the gimlet-pointing device and the blank-holder and being made of two parts, one of said parts being threaded, a shaft, and connections between said shaft and the threaded part of the nut for automatically moving the same toward and from the other part of the nut, substantially as specified.

60. In a machine of the character set forth, the combination of a cutting-device, a blank-holder, means for moving said holder toward and from said device, a sliding support for said device, and means controlled by the movement of said holder to move the support toward the blank-holder, said means comprising a pivoted arm having one end operatively engaging said support, and a connection between the opposite end of said arm and said holder for moving such end by the movement of the holder, substantially as specified.

61. In a machine of the character set forth, the combination of a gimlet-pointing device, said device comprising a cutter, a sliding support carrying said cutter, a blank-holder, and means for moving said support toward and from said blank-holder, said means comprising an arm pivoted intermediate of its ends and having one end operatively connected with said support and having its other end provided with a member connected thereto and adapted to yield in one direction, and an inclined member operatively connected with said holder and adapted to engage the latter member, substantially as specified.

62. In a machine of the character set forth, the combination of a gimlet-pointing device, said device comprising a cutter, a sliding support carrying said cutter, a blank-holder, and means for moving said support toward and from said blank-holder, said means comprising an arm pivoted intermediate of its ends and having one end operatively connected with said support and having its other end provided with a member connected thereto and adapted to yield in one direction, a wedge operatively connected with said holder and adapted to engage the latter member, and a spring connecting said arm with said slide, substantially as specified.

63. In a machine of the character set forth, the combination of a gimlet-pointing device, said device comprising a cutter, a sliding support carrying said cutter, a blank-holder, and means for moving said support toward and from said blank-holder, said means comprising an arm pivoted intermediate of its ends and having one end operatively connected with said support and having its other end provided with an inwardly-projecting arm pivotally mounted thereon, a stop upon the arm for limiting the rotation of said inwardly projecting arm in one direction, a spring for returning said arm to said stop, and a rod operatively connected with said holder and provided with an operating device having an inclined face adapted to engage said arm and thereby rock the former arm by the movement of the holder in one direction, substantially as specified.

64. In a machine of the character set forth, the combination of a gimlet-pointing device, said device comprising a cutter, a sliding support carrying said cutter, a blank-holder, and means for moving said support toward and from said blank-holder, said means comprising an arm pivoted intermediate of its ends and having one end operatively connected with said support and having its other end provided with an inwardly projecting arm pivotally mounted thereon, a stop upon the arm for limiting the rotation of said arm in one direction, a spring for returning said arm to said stop, a rod operatively connected with said holder and provided with an operating device having an inclined face adapted to engage said arm and thereby rock the former arm by the movement of the holder in one direction, and a spring resisting the movement of the former arm by said operating device, substantially as specified.

65. In a machine of the character set forth, the combination of a gimlet-pointing device, said device comprising a cutter and a sliding member carrying said cutter, of an arm pivoted intermediate of its ends and having its upper end bearing against said sliding member, a spring connecting said arm and said member, a spring connected with the lower end of said arm and forcing the same inwardly, a second arm rotatably mounted on the first arm, a spring tending to rotate the latter arm in one direction, a stop upon said arm for limiting such rotation, a blank-holder, means for moving said holder toward and from the cutting device, and a wedge-shaped member operatively connected with said blank-holder and having an inclined face adapted to engage the second arm and thereby move the lower end of the former arm outwardly, substantially as specified.

66. In a machine of the character set forth, the combination of a gimlet-pointing device, said device comprising a slide and a cutter thereon, of a blank-holder, a spindle for rotating the same, means for moving said spindle toward said device, said means comprising a lever, a shaft, a cam on said shaft adapted to engage said lever and thereby move said lever and the spindle in one direction, a second lever adapted to move said spindle in the opposite direction, an arm for moving said slide, and connections between said arm and the last-mentioned lever, substantially as specified.

67. In a machine of the character set forth, the combination of a gimlet-pointing device, said device comprising a gimlet-pointing cutter and a nut comprising a fixed part and a movable part, a blank-holder, means for moving said holder toward and from said device, and means for automatically moving the movable part of the nut toward and from the other, said means comprising an inclined member adapted to engage a corresponding inclined face on said movable part, a shaft, and connections for automatically operating said inclined member from said shaft, substantially as specified.

68. In a machine of the character set forth, the combination of a gimlet-pointing device, said device comprising a gimlet-pointing cutter and a nut comprising a fixed part and a movable part, a blank holder, means for moving said holder toward and from said device, and means for automatically moving the movable part of the nut toward and from the other, said means comprising an inclined member adapted to engage a corresponding inclined face on said movable part, a shaft, connections for automatically operating said inclined member from said shaft, and a spring tending to separate the movable part of the nut from the fixed part, substantially as specified.

69. In a machine of the character set forth, the combination of a gimlet-pointing device, said device comprising a gimlet-pointing cutter and a nut comprising a fixed part and a movable part, a blank-holder, means for moving said holder toward and from said device, and means for automatically moving the movable part of the nut toward and from the other, said means comprising a saddle one arm of which is provided with an inclined face coöperating with a similar face on the movable part of the nut and the other arm forming an abutment for the fixed part of the nut, a shaft, and connections for automatically reciprocating said saddle by the rotation of said shaft, substantially as specified.

70. In a machine of the character set forth, the combination of a gimlet-pointing device, said device comprising a gimlet-pointing cutter and a nut comprising a fixed part and a movable part, a blank-holder, means for moving said holder toward and from said device, and means for automatically moving the movable part of the nut toward and from the other, said means comprising an inclined member adapted to engage a correspondingly inclined face on said movable part, a rotary shaft, a cam thereon, a lever, and connections between said lever and said inclined member, substantially as specified.

71. In a machine of the character set forth, the combination of a shaft, a cutting device comprising a rearwardly inclined guideway, a cutter in said guideway, a holder, and connections between said shaft and said holder and cutter whereby the rotation of the shaft will cause said cutter and holder to simultaneously approach each other, substantially as specified.

72. In a machine of the character set forth, the combination of a blank-holder, means for reciprocating the same, a knife, a holder therefor, said knife and holder being mounted in a guide-way which is inclined with reference to the direction of the movement of the blank holder, means for moving the blank-holder toward and from the knife, and means for moving the knife-holder in its guideway, said means comprising a member having an inclined face, and a connection between said member and the knife holder, substantially as specified.

73. In a machine of the character set forth, the combination of a blank-holder, means for reciprocating the same, a knife, a holder therefor, said knife and holder being mounted in a guide-way which is inclined with reference to the direction of the movement of the blank holder, a shaft, means for moving a blank holder toward and from the knife, connections between said shaft and the knife-holder for moving the knife in its guideway, said connection comprising a member movable transversely of the guideway and having an inclined face adapted to engage said knife-holder, and a connection between said shaft and said member, substantially as specified.

74. In a machine of the character set forth, the combination of a blank-holder, means for reciprocating the same, a knife, a holder therefor, said knife and holder being mounted in a guide-way which is inclined with reference to the direction of the movement of the blank-holder, means for moving said blank-holder toward and from said knife, and means for automatically moving said knife in said guideway, said means comprising a member movable transversely of said guideway and having an inclined face provided with a dovetailed projection fitting a correspondingly-shaped recess in an inclined end of the knife-holder, a shaft, and connections between the shaft and member for operating the latter.

75. In a machine of the character set forth, the combination of a cutting device comprising a relatively fixed member adapted to engage a blank and a movable cutting member mounted in an inclined guideway, means for moving said cutting member along said guideway, a blank-holder and means for moving said holder toward said cutting device, substantially as specified.

76. In a machine of the character set forth, the combination of a cutting device comprising a guideway, a cutting member, a holder therefor mounted in said guideway, said holder having an inclined operating end provided with a dove-tailed recess, an operating member mounted in said guide-way, and movable transversely thereof, said operating member having a dove-tailed projection on an inclined face adapted to fit in said recess, means for reciprocating said member, and a blank-holder movable toward and from said device, substantially as specified.

77. In a machine of the character set forth, the combination of a cutting device comprising a guideway, a holder mounted in said guideway, a knife on said holder, means for reciprocating said holder in said guideway, a blank-holder, means for reciprocating the same toward and from the cutting device, a chuck adapted to engage the blank, and means for adjustably clamping said chuck in place, substantially as specified.

78. A coning device for machines of the character set forth comprising a knife-holder having a longitudinal recess therein, a knife mounted in said recess, and means for clamping said knife in place, said means comprising a recess in the inner face of the knife having a tapered end, a pin carried by said holder and having a correspondingly tapered end, said tapered end being of less width than said recess, a clamping member having an inclined face adapted to engage the correspondingly inclined face of the knife, and means for securing said clamping member to said holder, substantially as specified.

79. A coning device for machines of the character set forth comprising a knife-holder having a longitudinal recess therein between the top and bottom thereof, a knife mounted in said recess, and means for clamping said knife in said recess, the outer top portion of the holder being cut away from the end inwardly toward the heel of the knife, substantially as specified.

80. A coning device for machines of the character set forth comprising a tool holder mounted in a guideway, means for reciprocating said holder in said guideway, a chuck member, and means for adjustably securing the same in place, said means comprising an L-shaped locking member having a recess formed in one portion thereof for the reception of the corresponding projection on the bottom of said chuck member and having the end of its other portion threaded, and a nut on such thread, substantially as specified.

81. In a machine of the character set forth, the combination of a threading device comprising a pair of die-members, a blank-holder, means for moving said holder toward and from said die members, a shaft, a member adapted to be reciprocated by said shaft to open and close said die members, and a yielding connection between said shaft and said member, substantially as specified.

82. In a machine of the character set forth, the combination of a threading device comprising a pair of die-members, a blank-holder, means for moving said holder toward and from said die members, a pair of levers pivoted intermediate their ends and each having one end connected to a die member, a slide interposed between the opposite ends of said levers and having an inclined surface adapted to operate upon the same, a shaft, and a connection between said shaft and said slide, said connection comprising a rod connected to said slide, a stop on said rod, a spring on said rod, and a member sleeved on said rod and bearing against said spring and operatively connected with said shaft, substantially as specified.

83. In a machine of the character set forth, the combination of a blank-holder, a blank-carrier, a shaft therefor arranged to move the carrier, a spring for rotating said shaft in one direction, a second shaft, and connections between said shafts for automatically rocking the former shaft against the action of its spring, substantially as specified.

84. In a machine of the character set forth, the combination of a blank-holder, a blank carrier, a shaft therefor arranged to move the carrier, a spring for rotating said shaft in one direction, a continuously rotating shaft, connections between said shafts for automatically rocking the former shaft against the action of its spring, and means operated by the second shaft for blocking the rotation of the first shaft, substantially as specified.

85. In a machine of the character set forth, the combination of a blank-holder, a blank-carrier, a shaft, connections whereby said shaft may move said carrier in front of the holder, means for rotating said shaft in a direction to move the carrier in front of the holder, means for temporarily blocking the rotation of the shaft, and means for automatically rotating said shaft against the action of its rotating means, substantially as specified.

86. In a machine of the character set forth, the combination of a blank-holder, a blank-carrier, a shaft, connections whereby said shaft may move said carrier in front of the holder, means for rotating said shaft in a direction to move the carrier in front of the holder, an arm carried by said shaft, a lever, a rotary shaft, a cam on said shaft, and a connection between said lever and said cam, substantially as described.

87. In a machine of the character set forth, the combination of a blank-holder, a blank-carrier, a shaft connected thereto, a spring tending to rotate said shaft to move said carrier in front of the holder, a second shaft, a cam thereon, a lever operated by said cam, and an arm connected to the first shaft and engaged by said lever, substantially as specified.

88. In a machine of the character set forth, the combination of a holder, a spindle connected thereto, means for rotating said spindle, and means for reciprocating said spindle, said means comprising a member engaging the rear end of the spindle, a shaft having a pair of arms connected thereto, a connection between one of said arms and said member, a spring tending to rotate said shaft in a direction to move said member forwardly, a second shaft, and a cam on said shaft operatively engaging the other arm on the former shaft, substantially as specified.

89. In a machine of the character set forth, the combination of a holder, a spindle connected thereto, means for rotating said spindle, and means for reciprocating said spindle, said means comprising a member engaging the rear end of the spindle, a shaft having a pair of arms connected thereto, an adjustable connection between one of said arms and said member, a spring tending to rotate said shaft in a direction to move said member forwardly, a second shaft, a cam on said shaft operatively engaging the other arm on the former shaft, a pin projecting from said shaft, and a stop for said pin, substantially as specified.

90. In a machine of the character set forth, the combination of coning and gimlet-pointing devices, blank holders corresponding thereto, spindles connected to said holders, means for holding said holders, and means for reciprocating said spindles, said means comprising a cross-head having oppositely projecting arms, a yielding connection between one of said arms and one of said spindles, and means for automatically reciprocating said cross-head.

91. In a machine of the character set forth, the combination of coning, preliminary-threading, gimlet-pointing and finishing-threading tools, a plurality of blank holders or chucks corresponding to said tools, means for obtaining intermittent relative rotary movement between the tools and holders, means for obtaining a single reciprocatory movement between the coning, preliminary-threading, and finishing-threading tools and the holders corresponding thereto, and means for obtaining a plurality of reciprocatory movements between the gimlet-pointing tool and the holder or chuck temporarily corresponding thereto.

92. In a machine of the character set forth, the combination, with a series of spindles, each arranged to be driven in a reverse direction from its adjacent spindles, of a rotary support for said spindles, means for intermittently advancing said support, a common driving member for all of said spindles, and arranged to operatively engage said spindles in turn, and means for reversing the rotation of each spindle prior to its engagement with the common driving member.

93. In a machine of the character set forth, the combination of a rotary support, means for intermittently rotating the same, a plurality of spindles mounted in said support and provided with intermeshing gears, whereby each spindle is driven in a reverse direction from its adjacent spindle, a common drive member adapted to engage each spindle gear in succession, and means for reversing the direction of rotation of the spindle gears prior to their engagement with said driving member.

94. In a machine of the character set forth, the combination of coning, threading, and gimlet-pointing tools, a plurality of chucks or holders corresponding to said tools, means for obtaining intermittent relative rotary movement between the tools and holders, means for securing a reciprocatory movement between the coning and threading tools and the holders or chucks temporarily corresponding thereto, and means for obtaining a plurality of reciprocatory movements between the gimlet-pointing tool and the chuck or holder temporarily corresponding thereto.

95. In a machine of the character set forth, the combination of coning, threading and gimlet-pointing tools, a blank holder, means for causing said holder to aline successively with said tools, means for obtaining relative reciprocatory movement between said holder and each tool successively, and means for causing a plurality of reciprocations between the gimlet-pointing tool and said holder.

96. In a machine of the character set forth, the combination of a coning tool and a gimlet pointing tool, a pair of blank holders, means for obtaining relative intermittent rotary movement between said tools and said holders, means for obtaining relative reciprocatory movement between the coning tool and the holder temporarily corresponding thereto, and means for obtaining a plurality of reciprocations between the gimlet-pointing tool and the holder temporarily corresponding thereto.

97. In a machine of the character set forth, the combination of a coning and a gimlet pointing tool, a blank holder, means for obtaining relative intermittent rotary movement between said tools and said holder, means for obtaining reciprocatory movement between the coning tool and the holder, and means for obtaining a plurality of reciprocations between the gimlet-pointing tool and said holder.

98. In a machine of the character set forth, the combination of a blank holder or chuck having means for receiving and retaining a blank, a tool, means for reciprocating said holder or chuck toward and from said tool, a blank carrier, means for reciprocating the same between said chuck and tool, and means whereby the movement of the chuck or holder toward the tool is temporarily arrested after the chuck has taken a blank from the carrier, substantially as specified.

In testimony whereof, I hereunto affix my signature in the presence of two witnesses.

JOHN S. BROUGHTON.

Witnesses:
J. B. HULL,
A. J. HUDSON.